(12) United States Patent
Achillopoulos

(10) Patent No.: US 9,977,481 B2
(45) Date of Patent: May 22, 2018

(54) MULTI-FUNCTION PORTABLE DATA MANAGEMENT AND PROCESSING SYSTEM

(71) Applicant: Evangelos Achillopoulos, Alimos (GR)

(72) Inventor: Evangelos Achillopoulos, Alimos (GR)

(73) Assignee: ACROMOVE EUROPE S.M. P.C., Athens (GR)

( * ) Notice: Subject to any disclaimer, the term of this patent is extended or adjusted under 35 U.S.C. 154(b) by 85 days.

(21) Appl. No.: 15/099,507

(22) Filed: Apr. 14, 2016

(65) Prior Publication Data
US 2016/0266913 A1    Sep. 15, 2016

Related U.S. Application Data

(60) Provisional application No. 62/147,576, filed on Apr. 14, 2015.

(51) Int. Cl.
*G06F 11/00* (2006.01)
*G06F 1/32* (2006.01)
(Continued)

(52) U.S. Cl.
CPC .......... *G06F 1/3234* (2013.01); *G06F 1/1628* (2013.01); *G06F 1/182* (2013.01); *G06F 9/45558* (2013.01); *G06F 11/1464* (2013.01); *G06F 11/1469* (2013.01); *G06F 2009/45575* (2013.01)

(58) Field of Classification Search
CPC ............ G06F 11/1464; G06F 11/1469; G06F 1/1628; G06F 9/45558
See application file for complete search history.

(56) References Cited

U.S. PATENT DOCUMENTS

| | | | |
|---|---|---|---|
| 2007/0186251 A1* | 8/2007 | Horowitz | H04L 41/0896 725/63 |
| 2008/0113676 A1* | 5/2008 | Hutton | H05K 5/06 455/461 |

(Continued)

*Primary Examiner* — Charles Ehne
(74) *Attorney, Agent, or Firm* — George C. Pappas

(57) ABSTRACT

There is disclosed a carry-on sized, portable apparatus configured as a processing apparatus for use as a single node, or as a node in a cluster of nodes, of a hyper-converged system. The apparatus is designed for quick extraction from the hyper-converged system in the event of a disaster and also configured to be able to re-establish communication for users requiring immediate access to mission critical applications in remote re-deployment. The processing apparatus includes an exoskeleton carrier with internally disposed chassis, the chassis including sub-chassis sections to securely contain an integrated power supply and management system, an integrated management and control system (MCS), and other electronics. The integrated MCS runs critical virtualization technology and is script configurable by an external programming source to operate as a single node, or as a node in a cluster of nodes, of a hyper-converged system in normal mode, but also in other modes in order to support disaster recovery contingencies. In an alternate embodiment, the apparatus is a data storage device with a separate dedicated MCS which helps with provisioning the apparatus on a network environment, but which is likewise configured for remote use such as in a disaster recovery.

17 Claims, 14 Drawing Sheets

(51) Int. Cl.
*G06F 9/455* (2018.01)
*G06F 11/14* (2006.01)
*G06F 1/16* (2006.01)
*G06F 1/18* (2006.01)

(56) References Cited

U.S. PATENT DOCUMENTS

2010/0159877 A1\* 6/2010 Salkini .................. H04W 48/04
                                                                         455/411
2015/0249586 A1\* 9/2015 Byers .................... H04L 43/0805
                                                                         709/224

\* cited by examiner

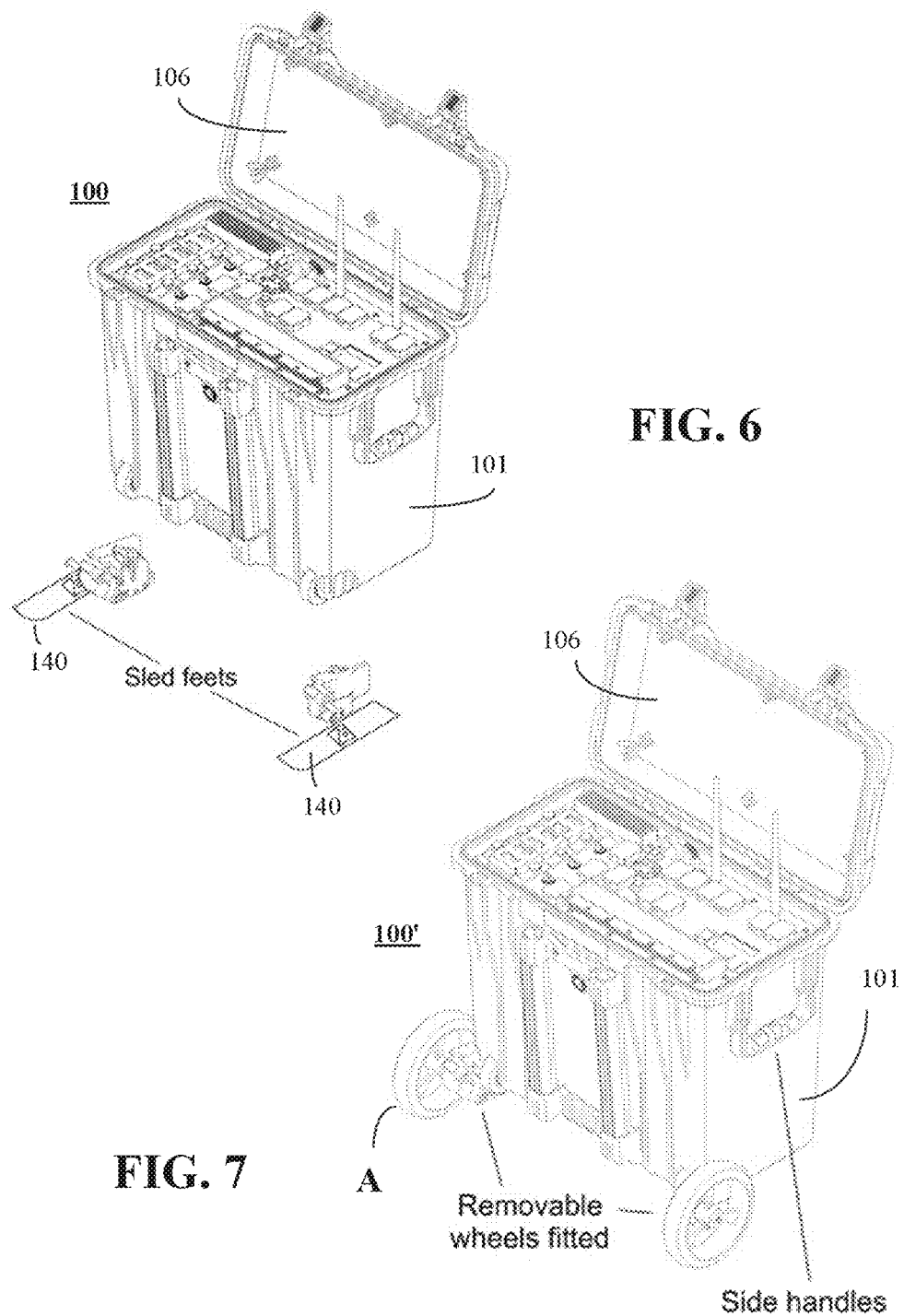

System Building Blocks

Data Storage apparatus

APPARATUS 100
CONFIGURATION
OPTION A

Processing apparatus

APPARATUS 100
CONFIGURATION
OPTION B

MULTI-FUNCTION PORTABLE DATA MANAGEMENT AND PROCESSING SYSTEM

RELATED APPLICATIONS

The present application claims priority to related U.S. Provisional application 62/147,576, titled "Multi-Function Portable Data Management and Processing System" filed on Apr. 14, 2015, commonly owned and assigned to the same assignee hereof.

FIELD

The present disclosure relates to disaster recovery, and particularly, disaster recovery devices and techniques in connection with hyper-converged infrastructures.

BACKGROUND

Traditional IT infrastructures were made up of the proverbial technology silos. They included experts in networking, storage, systems administration, and software. But much of that has changed over the past decade or so as virtualization has become a prominent technology tying networks and servers together.

Today's virtual environments can be likened to the ubiquitous smartphone. Smartphone users generally don't concern themselves with issues such as storage or systems management; everything they need is just an app. Similarly, storage management on converged infrastructure systems are provisioned essentially as an app as well.

Generally speaking, there are two approaches companies can take to building a converged infrastructure. One is a hardware-focused, building-block approach, sometimes referred to as having a converged architecture. The second approach is a hyper-converged architecture where all the technology is essentially software defined.

In a converged architecture, each of the components in the building block is a discrete component that can be used for its intended purpose—the server can be separated and used as a server, just as the storage can be separated and used as functional storage. By contrast, in a hyper-converged architecture—the technology being software defined—in essence the building blocks are all integrated and cannot be broken out into separate components.

When a company desires to implement server or desktop virtualization, in an early generation typical non-converged approach, physical servers would be set up to run a virtualization hypervisor the role of which is to manage each of the virtual machines (VMs) created on that server. The data storage for those physical and virtual machines would be provided by direct attached storage (DAS), network attached storage (NAS) or a storage area network (SAN).

By contrast, in a converged architecture, the storage is attached directly to the physical servers. Flash storage generally is used for high-performance applications and for caching storage from the attached disk-based storage. With hyper-converged architectures, the infrastructure includes a storage controller function running as a service on each node in the cluster to improve scalability and resilience. The storage logic controller, which normally is part of SAN hardware, may for example serve as a software service attached to each VM at the hypervisor level. This software defined storage approach takes all of the local storage across the cluster and configures it as a single storage pool. Data that needs to be kept local for the fastest response could be stored locally, while data that is used less frequently can be stored on one of the servers that might have spare capacity.

Like traditional infrastructures, the cost of a hyper-converged infrastructure can vary dramatically. In addition to licensing costs associated with the particular virtualization technology (hypervisor) deployed, there are many costs involved in configuring the software for use in a given environment.

"Software defined" allows programmatic control of the corporate infrastructure as a company moves forward. For this reason, hyper-converged infrastructures are becoming a best IT planning approach when a company's ability to address automation, orchestration, and control more quickly and effectively to account for increased needs to expand the overall computing environment is critical.

Hyper-converged infrastructures allow an IT operator to be able to easily reconfigure the infrastructure at the hypervisor level to respond to changes in configuration more quickly than was possible in the past, providing a very cost-effective long term solution, at least for those companies that are designing an infrastructure budgeted for future expansion.

Expansion often involves rolling out x86-based servers in a building-block chassis to allow a company to easily expand the computing environment with new hardware. With hyper-converged architectures, a downstream savings is realized by having budgeted for expansion in the form of lower support and maintenance costs. With that said, because the software is a key component of a hyper-converged infrastructure, integration of new hardware to an existing infrastructure needs to be carefully thought through in advance so that the expansion goals and objectives—which often involve optimization of resources for mission critical workloads—are achieved.

With hyper-convergence, there is an overall convergence trend whereby more and more distributed hardware components are being combined together making it possible to pack an entire datacenter into an appliance form factor.

Also, hyper-convergence being built around virtualization technology, another name of which is hypervisor, in essence what happens is that the virtual aspects of an infrastructure are brought together with the physical, resulting in a single solution. Many hyper-converged solutions include software hooks which allow for the hypervisor and related management tools to be easily integrated when configuring a hyper-converged system. In some cases, the entire virtualization layer can be embedded into the system itself. In this way, aspects such as automated management, system clustering and hardware failure recovery, virtualization management, resource provisioning, and VM failover can be handled by the virtualization layer once setup and running.

With a hyper-converged infrastructure, all desired applications that a company needs to run across a common computing environment will behave as a single, comprehensive system. Servers, storage and virtualization stack are not only bundled together, but are completely integrated and transparent to the administrator.

In this regard, hyper-convergence has extended the trend of datacenter convergence beyond hardware components to include integration of the hypervisor itself.

A converged infrastructure can be configured in a single rack or even expanded for scalable clouds.

From a load balancing standpoint, in a physical server environment, each workload requires a compatible server configured and tuned to optimize results for that particular application. From the perspective of optimizing each workload, this makes sense because you want to build the application on the best possible platform to achieve a best result. Keeping the physical layout and configuration for each particular machine—and ordering, building and implementing them on a custom basis for each workload—creates a tremendous amount of variability and complexity across a server virtualization storage environment.

Buying separate software, servers, storage and networking, and then attempting to make it all fit together is akin to buying a car by ordering an engine from one manufacturer, the chassis from another and the wheels, seats and body from additional vendors. While theoretically it might be possible to get better results than trusting the combination a single vendor recommends, the likelihood of such a result is extremely low. With improvements in the ability of industry-standard x86 components to handle demanding workloads, and the standardization of components from one vendor to another, many IT architects are realizing that there's more value in making things consistent and eliminating variability, rather than striving for the absolute best architecture for each individual workload.

Converged storage options are a natural outcome of this line of thinking. The rise of virtual servers has had a homogenizing effect on IT requirements. Today, you just need to know your workload is compatible with virtualization, and that your server is compatible with your virtual server technology, and that's how you build the server. The specific requirements of each application in the virtual server environment become, to some extent, less important.

As organizations rely on virtual server technology for a bigger percentage of the workloads they run, server virtualization storage needs need to be provided by customized configurations that differ by workload.

Hyper-converged architectures act as a homogenizing factor, removing variability and interoperability from the equation. When organizations standardize on a virtual server technology, and run a majority of their production workloads in a hyper-converged environment, this allows for a much higher level of infrastructure consistency from workload to workload.

Appropriate provisioning of resources between applications is a key aspect of hyper-converged systems. Thin provisioning is an example feature that's especially helpful in virtual server environments. Thin provisioning allows every server to get the same allocation process and the appearance of the same amount of capacity, but the physical space isn't reserved for that server until it actually needs it. This gives the environment the best of both worlds—the process is consistent and can be highly automated, but the storage capacity consumption is dramatically reduced.

Disaster Recovery

In a hyper-converged system, all VMs run on the system. In the event of a disaster, the VMs may be unable to connect to the system to access mission-critical information. One data recovery approach involves having virtual machines run in the cloud while a business gets back on its feet. Many organizations have begun basing their disaster recovery plans completely around the cloud.

Virtual machines run in the cloud until data center issues can be resolved. The problem is getting virtual machines to function in the cloud. Another problem is being able to seamlessly restore access to real-time data which may not have been backed up to the cloud immediately before the system went down due to a disaster.

These problems have created a need for solutions capable of providing mission critical access to data to one or more key personnel in the event of a major disaster when access to an established, hyper-converged infrastructure is impossible.

SUMMARY

The present disclosure relates to a carry-on sized, portable apparatus configured for use as a single node, or as a node in a cluster of nodes, of a hyper-converged system.

The apparatus is designed for quick extraction from the hyper-converged system in the event of a disaster and also configured to be able to re-establish communication for users requiring immediate access to mission critical applications in remote re-deployment.

The processing apparatus includes an exoskeleton carrier with internally disposed chassis, the chassis including sub-chassis sections to securely contain an integrated power supply and management system, an integrated management and control system (MCS), and other electronics. The integrated MCS runs critical virtualization technology and is script configurable by an external programming source to operate as a single node, or as a node in a cluster of nodes, of a hyper-converged system in normal mode, but also in other modes in order to support disaster recovery contingencies.

In an alternate embodiment, the apparatus is a data storage device with a separate dedicated MCS which helps with provisioning the apparatus on a network environment, but which is likewise configured for remote use such as in a disaster recovery.

In one aspect the apparatus is encased in a carry-on sized type carrier case and weighs less than 50 lbs. In one scenario, the apparatus includes at least one of a retractable top pulling handle and one or more side handles.

In another aspect, the apparatus includes straps and a back-facing side designed to allow for transport as a back pack.

In another aspect, the carrier case is made from a durable, waterproof material and configured as an exoskeleton encase of an internal chassis housed therein, and separated in whole or in part by mechanical isolation material. Elastic foam, foam layers of different elasticity, or a specially designed elastic foam layer interface is provided for the mechanical isolation.

In another aspect, shock absorbing mounts are provided.

In another aspect, the carrier case includes detachable wheels or sleds for ease of ground transport.

In another aspect, the carrier case is a top-access design to facilitate dismounting the chassis and components coupled thereto from the top during integration, setup, cleaning, repair, battery exchange, or the like, and at the same time prevent water from entering the interior below a certain height from the ground base for flood protection.

In another aspect, the top-access design is configured so that all I/O ports are accessible from the top with electrical IO wiring being configured to connect to the IO ports from the top plane of the chassis, and easily removable to allow the carrier top lid to be closed quickly and easily in an emergency situation.

In another aspect, the top plane is of a water resistant configuration, including IO ports, to protect against rain droplets and humidity, while allowing air to circulate from/to side vents.

In another aspect, three shock absorbing mechanisms are included: (i) elastic foam to absorb shocks between case and chassis, (ii) shock absorbers disposed between chassis and all internal individual sub-chassis housing individual electronic component or assembly made from a combination of natural rubber for spring action and elastic polymer foam for dumping action, and (iii) shock mounts made from elastic rubber tubes and locking screws.

In another aspect, the portable apparatus is configured with floatation enabling material to provide floatation in event of flooding.

In another aspect, interior shielding, between case and chassis is provided including at least one of (i) heat transfer insulation using insulation foam to isolate external environmental conditions and (ii) EMF protection by way of grounded cooper shielding layer.

In another aspect, the portable apparatus is equipped with a pre-heating mechanism for operation in extremely cold environments.

In another aspect, the portable apparatus includes a compartment below the chassis and inside the carrier configured to allow for liquid drainage, and an exit valve for drainage of the region.

In another aspect, the portable apparatus is colored, partially finished or stickered with glow in the dark material.

In another exemplary embodiment, there is disclosed a carry-on sized, portable apparatus adapted for use in disaster recovery, rough terrain, and harsh weather conditions and configured for use as a data apparatus. The data apparatus includes a chassis functioning as an integrated cabin that houses: (i) a management and control system, (ii) a power supply and management unit, (iii) multiple batteries, and (iv) a plurality of storage drives.

In one aspect, the data storage apparatus is configured to function as a regular storage node in a non-converged system and as a node of a hyper-converged system. In the latter case, the plurality of storage drives may be provisioned as virtual server under the control of virtualization technology managed by the management and control system.

In yet a further exemplary embodiment there is disclosed a carry-on sized, portable apparatus configured as a processing apparatus for use as a single node, or as a node in a cluster of nodes, of a hyper-converged system, and designed for quick extraction from the hyper-converged system in the event of a disaster for remote re-deployment.

The processing apparatus includes an exoskeleton carrier with internally disposed chassis, the chassis including sub-chassis sections to securely contain (i) an integrated power supply and management system, (ii) a location tracking unit, (iii) an integrated management and control system (MCS), (iv) a local control network (LCN) interface for wireless and wireline communication with an external master or slave MCS, or to operate the integrated MCS in stand-alone fashion, and (v) at least one server mother board each disposed on corresponding expansions cards along with a plurality of memory drives.

In one aspect, the integrated MCS runs virtualization technology and configured for use as a single node, or as a node in a cluster of nodes, of a hyper-converged system.

In a further aspect, the integrated MCS is comprised of a single or of a redundant set of embedded processor units which operate to facilitate communication via one or more wireless communication networks.

In a first aspect, the MCS is configured to provision the processing apparatus to run hypervisor in at least the following modes: (i) normal operation, (ii) emergency shutdown, (ii) emergency operation, and (iv) full shutdown.

The provisioning occurs on the basis of the MCS detecting and processing appropriate scripts, at setup, which on the one hand manage and control what the processing apparatus does when connected as a node to the hyper-converged system, and on the other hand, what the processing apparatus needs to do in the event of a major disaster requiring that it be disconnected from the system and transported safely away from any imminent threat.

In yet a further aspect, provisioning involves a user connecting to the apparatus via a proprietary cloud based control and provisioning service, identifying the scripts for each relevant operating mode, and using them to program the hypervisor layer so that the onboard electronics of the processing apparatus function and behave as one with other hypervisor managed nodes of a given computing infrastructure.

In one aspect, emergency shut down is triggered automatically in response to at least one of a physical, sensor-detected, or software triggered stimuli which when activated is indicative of possible, actual or imminent disaster. Once triggered, the MCS calls on the hypervisor to shutdown mission critical applications in a manner dictated by the corresponding script associated with the emergency shut down mode that's been programmed into the programming apparatus, and specifically, the MCS.

In accordance with a preferred embodiment, once the applications are shut down, and all other relevant actions taken, the processing apparatus is prepared to be taken offline and safely transported to a safe location, where it will be rebooted, this time, in emergency operation mode.

With proper planning and provisioning, all of which should be consistent with a company's Business Continuity Plan, it is possible to seamlessly and flawlessly in some cases remotely reestablish critical business functions in event of a major disaster so long as arrangements have been made in advance for the processing apparatus itself to be shut down and removed from danger.

The preparing of the processing apparatus to be taken offline, involves a user—preferably a security or IT officer closest to the device physically performing a series of business recovery and shutdown events, including unplugging external hardwire and wiring and preparing the carry-on carrier case which houses the chassis and all the assembled electronic components, so that it can be closed and protected from potential harm.

Once awoken again, now in emergency operation, the device may try to connect to the pre-emergency hyper-converged system. If unsuccessful, it may assume that a catastrophic computer environment event may have occurred and will follow the pre-programmed protocol associated with the script it had been provided at setup to connect users connected either directly to the apparatus or via a wireless connection, if available, preferably to a cloud based interface.

The installed hypervisor knows exactly the state of running applications just prior to entering emergency shutdown. As such, it is able to maintain on the MCS drives all relevant information that will allow the processing apparatus itself, to self-authenticate and manage demand for data and computing resources by authorized users connecting to the processing apparatus.

Once in emergency operating mode, the processing apparatus can tap both local (onboard) resources, as well as resources that may be available by satellite link, for example, to an appropriate cloud based service configured a priori to support disaster management functions and the computing needs of users on the ground. In this way, mission critical users can connect to specific key applications directly (or through the cloud based environment) to access and process critical data . . . away from the disaster area, even without the hyper-converged infrastructure being available.

These and other features and advantages of the present invention will be apparent from the description of exemplary embodiments provided herein.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which:

FIGS. 5-7 are further diagrammatic view of the apparatus in FIG. 1 to illustrate alternately available wheel and sled type fittings for transport.

DETAILED DESCRIPTION

Figure 1:
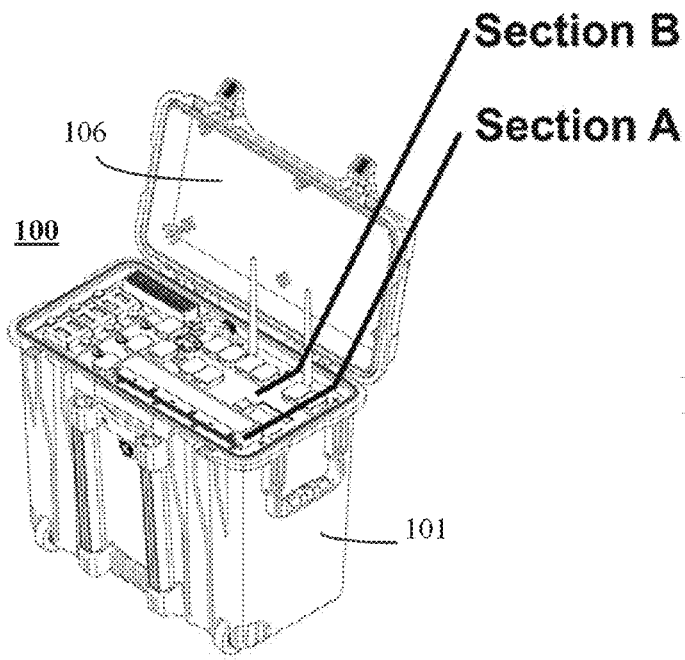
FIG. 1 is a diagrammatic view of carry-on sized portable apparatus designed to be configured for use as a single node, or as a node in a cluster of nodes, of for example a hyper-converged system in accordance with an exemplary embodiment.

The word "exemplary" is used herein to mean "serving as an example, instance, or illustration." Any embodiment described herein as "exemplary" is not necessarily to be construed as preferred or advantageous over other embodiments.

The following description is intended to convey a thorough understanding of the embodiments described by providing a number of specific embodiments and details involving methods and systems for managing content submission and publication of content. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design.

The terminology used herein is for the purpose of describing particular embodiments only and is not intended to limit the scope of the present invention. As used throughout this disclosure, the singular forms "a," "an," and "the" include plural reference unless the context clearly dictates otherwise. Thus, for example, a reference to "a module" includes a plurality of such modules, as well as a single module, and equivalents thereof known to those skilled in the art.

As was previously explained, with hyper-convergence, there is an overall convergence trend whereby more and more distributed hardware components are being combined together making it possible to pack an entire datacenter into an appliance form factor.

From a form factor perspective, packing all the critical software defined functionality associated with a hyper-converged system, into portable sized carrier, can gives rise to new applications and provides solutions to key problems in disaster recovery.

The present disclosure proposes a clever new construction for a carry-on sized, portable apparatus configured for use as a single node, or as a node in a cluster of nodes, preferably in a hyper-converged system. The main objective of the apparatus is to provide a "close and go" all-in-one hyper-converged network node in a single case.

The fundamental concept may be employed to also provide a carry-on sized portable, data storage apparatus with integrated ultra-high storage capacity (40 TB plus) configurable via an onboard management and control system for use in both converged (including hyper-converged) systems but also with traditional non-converged systems, and operable in normal and emergency operation modes.

The need of portable data storage apparatuses is particularly desirable in audio-video media creation as this allows quickly backing up terabytes of recorded audio visual content created outdoors, on the fly, into a safe, terrain and weather proof portable storage unit, such as the one proposed. Backing up huge amounts of data to a cloud based infrastructure is less than ideal in many situations, particularly when access to the cloud and with an adequate enough pipe to upload content effortlessly is not only desirable, it is critical. In this regard, having a portable data storage device is akin to carrying with you your very own intelligent storage server.

Having said that the key global demand in small factor portable intelligent small form factor server systems has given way from data to processing apparatuses capable of serving as integrated nodes in an organization's computing environments, many of which consist of multiple nodes, particularly in the case of hyper converged systems.

Toward that end, applicants have engineered a carry-on sized type carrier which weighs less than 50 lbs, with a close and carry construction which addresses many of the new challenges that organizations will be required to contend with in the years to come—or risk being legally exposed to claims by customers, patients, and/or clients alike, in the event of a catastrophic event when access to client mission critical applications and the data these applications need to access is either not available in a timely manner, or worse, permanently lost.

Hence, the convergence in technology and demand for small fall factor hyper-converged systems or system modes with "close and go" capability coupled with legal exposure for companies that fail to implement business continuity planning as part of the overall computing system development strategy, makes any solution that simultaneously addresses these challenges together, of high commercial value.

FIG. 1 is a diagrammatic view of carry-on sized portable apparatus 100 designed to be configured for use as a single node, or as a node in a cluster of nodes, of for example a hyper-converged system in accordance with an exemplary embodiment.

Figure 2A:
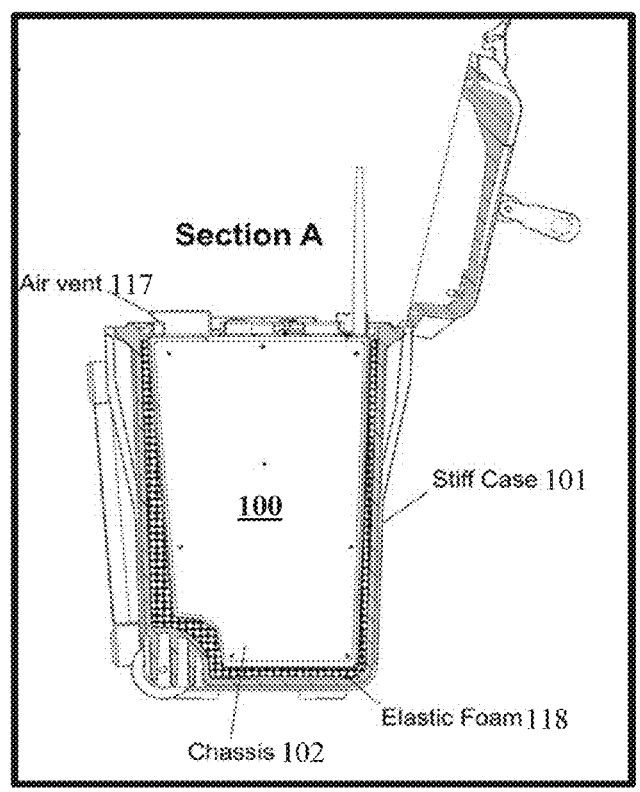
FIGS. 2A and 2B are cross-sectional perspective views taken along lines marked Section A and Section B, respectively, of the apparatus shown in FIG. 1.
Figure 2B:
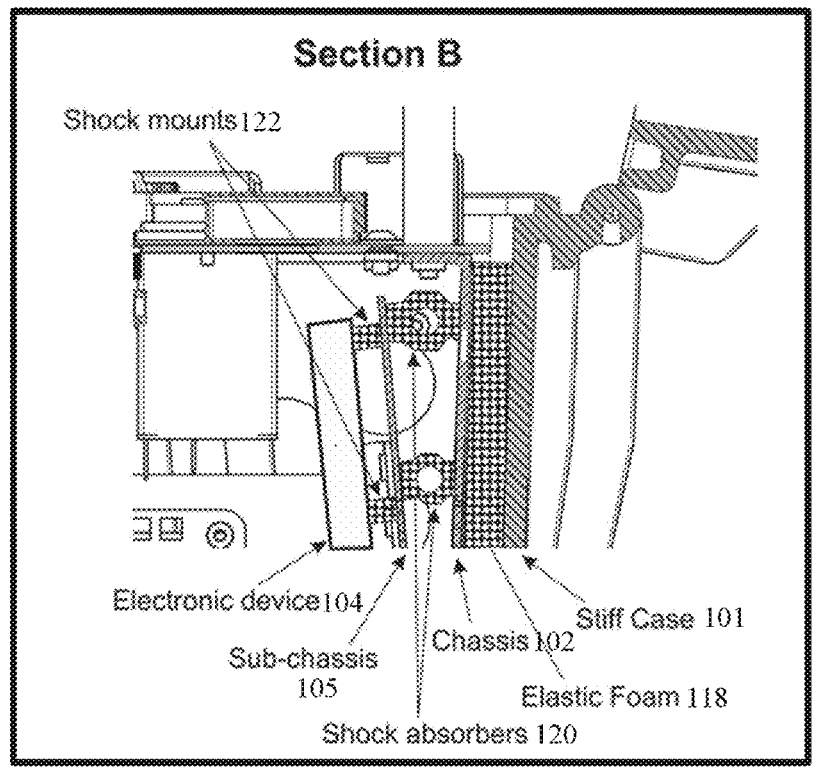

FIGS. 2A and 2B are cross-sectional perspective views taken along lines marked Section A and Section B, respectively, of the apparatus shown in FIG. 1.

Figure 3:
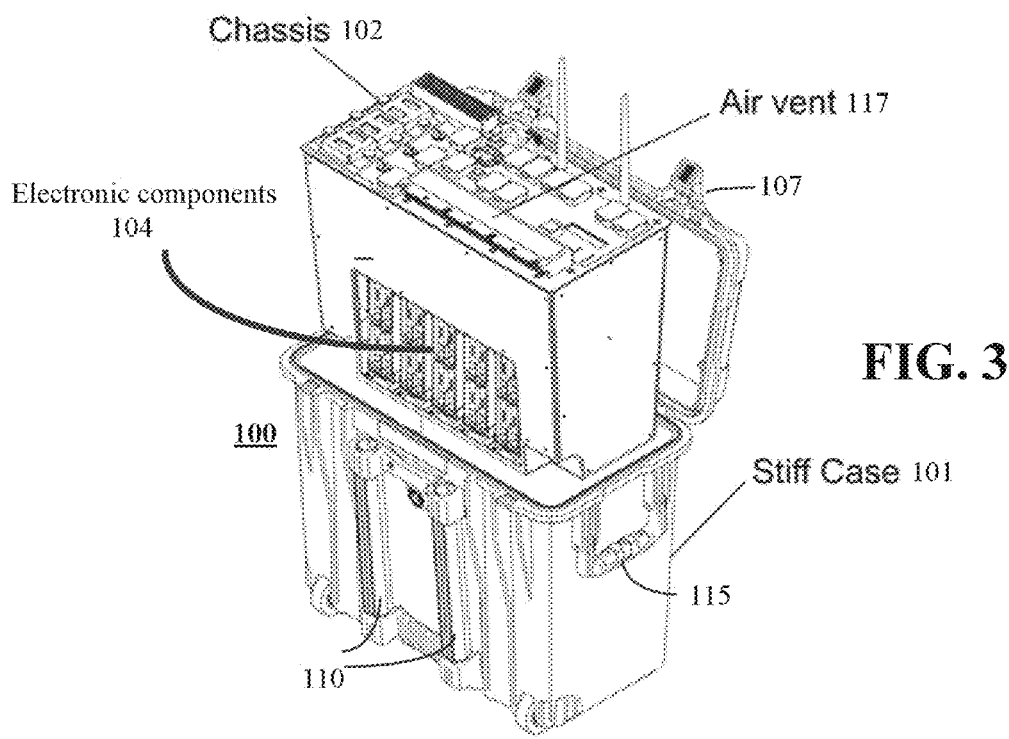
FIG. 3 is a further diagrammatic view of the apparatus of FIG. 1 showing an internal chassis in a removed position.

FIG. 3 is a further diagrammatic view of the apparatus of FIG. 1 showing an internal chassis in a removed position.

Referring to the above figures, apparatus 100 comprises an external case 101, an internal chassis 102, and various electronic components (collectively 104) deployed in appropriate sub-chassis (105) locations fitted throughout the internal chassis to accommodate components 104. Components 104 are envisioned as modular units capable of being provisioned, managed and controlled by one or more onboard management and control system units described in greater detail below.

Components 104 may include multiple MCS units and various electronic building blocks of modular design and form factor and configured to be easily fitted and removed as needed during installation, repair, reconfiguration or the like.

External case 101 is preferably constructed of either metal or polymer material or biomaterials or a combination of these materials. External case 101 includes one or more openings, lid or lids 106, and/or waterproof, and/or watertight, and/or tamperproof locking mechanism 107.

Lid 106 may be operated either in the open only or open and close positions, and may include additional electronics (e.g., integrated fractal antennas, temperature and humidity sensors, overheating protection sensors, speakers, etc.).

Apparatus 100 includes a variety of digital, analog and other type sensors that, among other things, can detect the lid open-closed status and sound alarms, as well as provide an electrical bus interface between onboard electronics, including between lid 106 and the main body of external case 101, via hinges (not shown) that connect the lid to the main body.

In one scenario, external case 101 includes retractable top pulling handle 110 and/or a pair of side disposed removable handles 115.

Air vents 117 provide cooling, heating and ventilation may be disposed along the top surface of the internal chassis.

Figure 4:
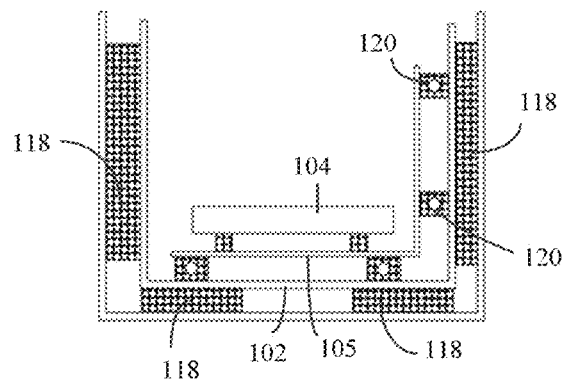
FIG. 4 is a partial, cross-sectional perspective view to illustrate the position and mounting style of shock absorbing material at the inside surface at the base of the exoskeletal case for the apparatus shown in FIGS. 1-3.

FIG. 4 is a partial, cross-sectional cut out perspective view to illustrate the position and mounting of elastic foam material 118, shock absorbers 120 and shock mounts in relation to internal chassis 102, internal bottom surface of stiff external case 101, and sub-chassis 105.

The combination of different shock absorbing materials in this way is believed to provide optimum protection against device damage due to shock type forces.

Figure 5:
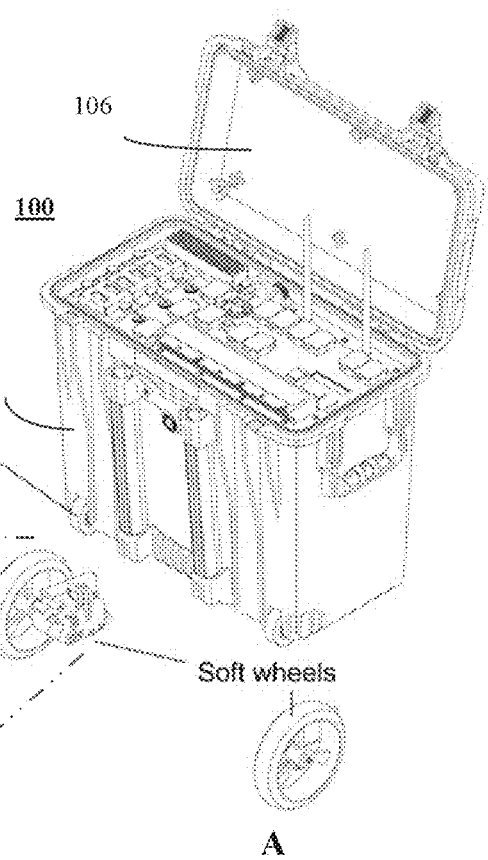

FIGS. 5-7 are further diagrammatic view of the apparatus in FIG. 1 to illustrate alternately available wheel and sled type fittings for transport.

Referring to FIG. 5, apparatus 100 is shown with a set of small form factor wheels 125 made of a solid hard material for normal use and installed thereon. In the vicinity of apparatus 100, a set of different, large wheels represented by the letter A, each of which is shown in blown up fashion. Wheels A comprise a static part 131, a moving arm to facilitate coupling and decoupling wheels A from case 101, as well as rubber material surfaces 133 for additional shock absorption and easier transport over rough surfaces.

In FIG. 6, sled type fittings 140 are shown which provide a further alternative wheel fitting option.

In a further exemplary embodiment (not shown), apparatus 100 may be dimensioned in a way to allow stacking multiple devices together or connecting two or more in a way that would allow carrying by a human easier.

The design and material characteristics of apparatus 100 should allow for appropriate elasticity and shock absorbance to protect against the effects of disruptive events such as construction debris due to earthquakes, water contact due to tornados and floods, strong impacts/shocks due to falls and even explosions to a certain extent, to cite a few instances.

Also, the device should withstand falls from relatively small heights, such as from the hands of a human, from a shelf, or even from a drone configured to carry, unload, position same into unfriendly terrain.

Apparatus 100 may bear internal and/or external sensors for various parameters, such as temperature, humidity, internal flooding of the case and others.

Apparatus 100 may include—between the walls of external case 101 and internal chassis 102, but also along lid 106, special insulation to protect the appliance from electromagnetic waves and other type of radiation, as well as from the elements, including extremely hot or cold temperatures.

Apparatus 100 may bear power input sockets where cables supplying energy from external sources, such as power grid, power generator, solar/photovoltaic panel or other source may be plugged. In addition, output sockets may be provided for connecting cables from external appliances, such as light sources, laptops, smart phones, computer chargers, external backup systems—drives or LTOs, telecommunication appliances and like devices.

Apparatus 100 may be configured to send warning signals and/or self-shutdown or place the appliance or parts of the appliance in hibernation, depending on environmental conditions or other pre-set parameters or after receiving a remote signal. When environmental temperature exceeds a certain limit, apparatus 100 may automatically go into hibernation or other operating mode, described in detail further below.

Apparatus 101 may further include a plurality of power inlets and outlets, networking and/or other interconnection inlets/outlets, such as Ethernet and/or Fiber channel sockets, and other networking, audio/visual cable sockets, antennas, display interfaces, speakers, and the like.

While designed as a stand-alone portable device, in normal server environment use, apparatus 100 is configured to connect to an organization's networking infrastructure via metal cable or cables, fiber optic lines, and/or via wireless operation.

Additionally, apparatus 100 may be specially configured to easily and automatically connect to another like apparatus 100 directly or indirectly in a commonly shared network. In one scenario, a special port is provided for electrically connecting two or more apparatus together in proximity to each other.

Apparatus 100 contains one or more electronic printed circuit boards that facilitate network routing or other type of data routing.

Apparatus 100 may connect to an organization's intranet to the internet, or directly to the internet, it may act as a wireless access point and/or router for networked electronic devices, including connected (directly or indirectly) virtual clients (VCs), via laptops, desktop computers, point of sale (POS) devices, IP network switches, other routers, firewalls, tablets, smart phones, servers, smart watches, and the like.

Apparatus may have location tracking functionality provided by onboard tracing/geo-positioning systems (GPS), smart beacon technology, and/or via communication modules (for example GSM, CDMA and LTE) capable of supporting tracking and position location.

External case 101 may be painted with a color or lining that it may be easily traced visually or with night-vision binoculars or glasses. In another aspect, case 101 is designed to change color to match surroundings for stealth deployment purposes.

It should be appreciated that the present apparatus, as contemplated herein, and as described in greater detail below in connection with actual commercial use applications, essentially provides a hyper-converged system network that is close and go. As such, integration of appropriate security mechanisms is a critical design component in many cases.

In this regard, apparatus 100 may include finger print or retinal identification mechanisms, or other authorization mechanisms, as well as mechanisms to alert of prior unauthorized attempts, and self-destruct mechanisms to protect the data in certain eventualities.

In yet a further scenario, passive tracking and/or tracing may be included. This may be achieved via passive radio-frequency proximity tags configured for use with proximity readers, for example.

In a preferred embodiment, apparatus 100 includes numerous high memory capacity modules and/or hard drives for mass data collection and storage. In one scenario, access to the modules is secured for tamperproof purposes. The modules may be connected via a controller card, motherboard, or other similar known means.

In another scenario, apparatus 100 may be configured without sockets, cavities, or vents of any kind. This is to isolate and protect the data from the elements, hazardous biological or radiological agents, and other non-electronic forms of data corruption.

Interior shielding, between case 101 and chassis 102, may be provided including at least one of (i) heat transfer insulation using insulation foam to isolate external environmental and (ii) EMF protection by way of grounded cooper shielding layer between the case 101 and the chassis.

Also, for operation in extremely cold environments, a preheating mechanism may be provided.

In an exemplary embodiment, a compartment below chassis 102 and inside carrier case 101 is provided to allow for drainage of trapped liquids. An exit valve likewise may be provided for drainage of the region.

In another aspect, the portable apparatus is colored, partially finished or stickered with glow in the dark material.

Figures 8, 9:
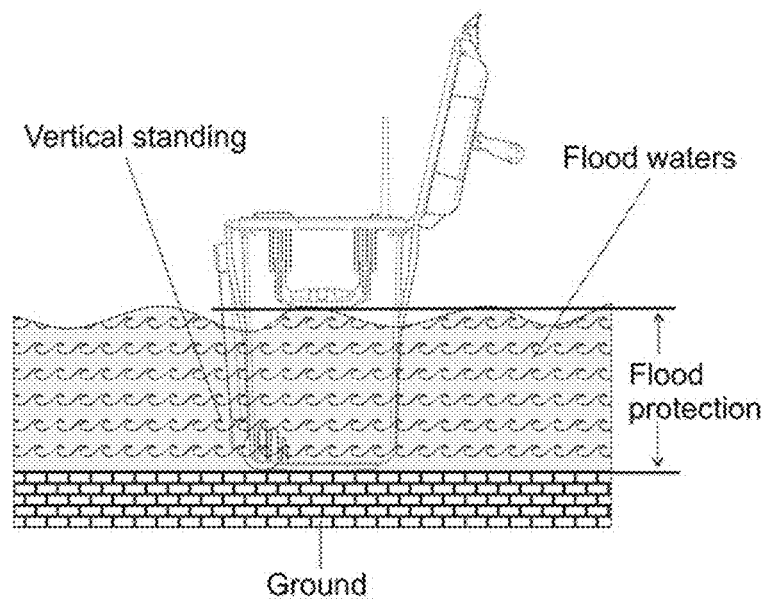
FIG. 8 is a side perspective standing view of the apparatus in FIG. 1 to illustrate flood protection capability in a flooded environment.
FIG. 9 is a high level block diagram illustrating two types of use configurations of the apparatus in FIG. 1 in accordance with an exemplary embodiment.

FIG. 8 is a side perspective standing view of the apparatus in FIG. 1 to illustrate apparatus 100 flood protection capability in a flooded environment. Apparatus 100 includes floatation enabling material to provide floatation in event of flooding.

FIG. 9 is a high level block diagram illustrating two types of use configurations of apparatus 100 may take in FIG. 1 in accordance with an exemplary embodiment.

Option configuration A (data storage apparatus) and option configuration B (processing storage apparatus) each comprise different modularized electronic components as explained below. With regards however to the carrier features and specifically the functionality of mechanical components, both configurations are similarly equipped and intended to accommodate uses not possible with traditional rack based and the like large form factor server and storage type systems.

Figure 10:
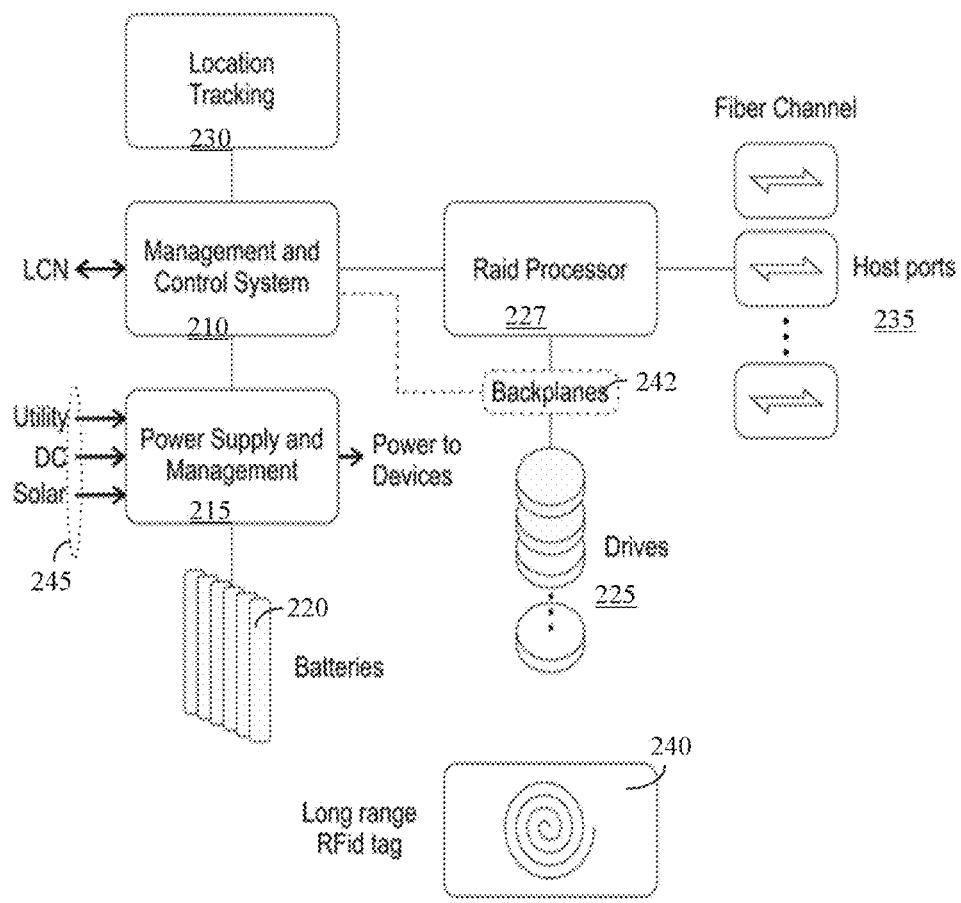
FIG. 10 is a functional, high level block diagram of the data storage apparatus configuration shown in FIG. 9.

FIG. 10 is a functional, high level block diagram of the data storage apparatus configuration shown in FIG. 9.

It should be appreciated that the data storage apparatus configuration is a carry-on sized, portable apparatus 100 adapted for use in disaster recovery, rough terrain, and harsh weather conditions and configured for use primarily as a data storage device.

In an exemplary embodiment, data storage apparatus 100 includes a chassis 101 which function as an integrated cabin to house key electronic components, including (i) management and control system 210 (ii) power supply and management unit (PCM) 215 (iii) multiple batteries 220, (iv) a plurality of storage drives, a raid processor 227, (v) location tracking unit 230, (vi) fiber channel host ports 235, and (vii) RFID Tag technology 240.

In one aspect, the data storage apparatus is configured to function either as a regular storage node in a non-converged system or as a node of a hyper-converged system. In the latter case, the plurality of storage drives may be provisioned as virtual servers under the control of virtualization technology managed by MCS 210.

MCS 210 manages all IO and storage activities, as well as networking functions via a bidirectional local control network interface (LCN) 245 link.

PCM 215 provides power control and management from one or more power sources, to and from batteries 220, and also regulates system voltage supplies for all onboard electrical assemblies and components.

Figure 11:
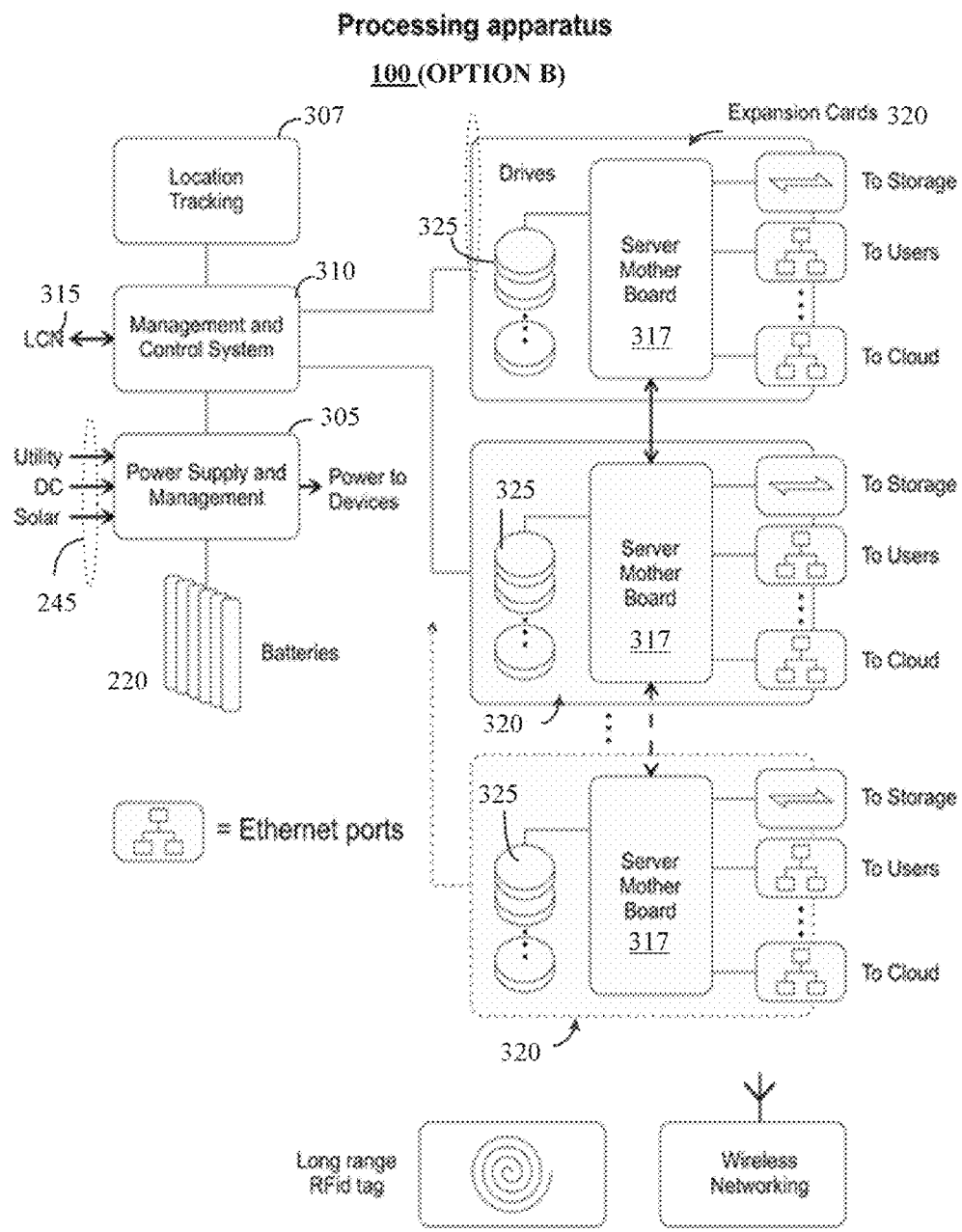
FIG. 11 is a functional, high level block diagram of the processing apparatus configuration shown in FIG. 9.

FIG. 11 is a functional, high level block diagram of the processing apparatus configuration shown in FIG. 9.

In this exemplary embodiment there is disclosed a carry-on sized, portable apparatus configured as a processing apparatus for use as a single node, or as a node in a cluster of nodes, of a hyper-converged system, and designed for quick extraction from the hyper-converged system in the event of a disaster for remote re-deployment.

The processing apparatus is physically constituted by the exoskeleton carrier case 101 with internally disposed chassis 102 shown in FIG. 1, for example. Chassis 101 includes a number of sub-chassis sections 105 which contain relevant electrical components and assemblies.

Referring to FIG. 11, the electrical components and assemblies are comprised of an (i) an integrated power supply and management system (PSM) 305, (ii) a location tracking unit 307, (iii) an integrated management and control system (MCS) 310, (iv) a local control network (LCN) interface 315 for wireless and wireline communication with an external master or slave MCS, or to operate the integrated MCS in stand-alone fashion, and (v) at least one server mother board each disposed on corresponding expansions cards 320 along with a plurality of memory drives 325.

In one aspect, integrated MCS 310 runs virtualization technology and is configured for use as a single node, or as a node in a cluster of nodes, of a hyper-converged system.

In a further aspect, integrated MCS 310 is comprised of a single or of a redundant set of embedded processor unit(s) which operate to facilitate communication via one or more wireless communication networks.

In a first aspect, the MCS is configured to provision the processing apparatus to run hypervisor in at least the following modes: (i) normal operation, (ii) emergency shutdown, (ii) emergency operation, and (iv) full shutdown.

The provisioning occurs on the basis of the MCS detecting and processing appropriate scripts, at setup, which on the one hand manage and control what the processing apparatus does when connected as a node to the hyper-converged system, and on the other hand, what the processing apparatus needs to do in the event of a major disaster requiring that it be disconnected from the system and transported safely away from any imminent threat.

In yet a further aspect, provisioning involves a user connecting to the apparatus via a proprietary cloud based control and provisioning service, identifying the scripts for each relevant operating mode, and using them to program the hypervisor layer so that the onboard electronics of the processing apparatus function and behave as one with other hypervisor managed nodes of a given computing infrastructure.

In one aspect, emergency shut down is triggered automatically in response to at least one of a physical, sensor-detected, or software triggered stimuli which when activated is indicative of possible, actual or imminent disaster. Once triggered, the MCS calls on the hypervisor to shutdown mission critical applications in a manner dictated by the corresponding script associated with the emergency shut down mode that's been programmed into the programming apparatus, and specifically, the MCS.

In accordance with a preferred embodiment, once the applications are shut down, and all other relevant actions taken, the processing apparatus is prepared to be taken offline and safely transported to a safe location, where it will be rebooted, this time, in emergency operation mode.

With proper planning and provisioning, all of which should be consistent with a company's Business Continuity Plan, it is possible to seamlessly and flawlessly in some cases remotely reestablish critical business functions in event of a major disaster so long as arrangements have been made in advance for the processing apparatus itself to be shut down and removed from danger.

The preparing of the processing apparatus to be taken offline, involves a user—preferably a security or IT office closest to the device) physically performing a series of business recovery and shutdown events, including unplugging external hardwire and wiring and preparing the carry-on carrier case which houses the chassis and all the assembled electronic components, so that it can be closed and protected from potential harm.

Once awoken again, now in emergency operation, the device may try to connect to the pre-emergency hyper-converged system. If unsuccessful, it may assume that a catastrophic event may have occurred and will follow the pre-programmed protocol associated with the script it had been provided at setup to connect users connected either directly to the apparatus or via a wireless connection, if available, preferably to a cloud based interface.

The installed hypervisor knows exactly the state of running applications just prior to entering emergency shutdown. As such, it is able to maintain on the MCS drives all relevant information that will allow the processing apparatus itself, to self-authenticate and manage demand for data and computing resources by authorized users connecting to the processing apparatus.

Once in emergency operating mode, the processing apparatus can tap both local (onboard) resources, as well as resources that may be available by satellite link, for example, to an appropriate cloud based service configured a priori to support disaster management functions and the computing needs of users on the ground. In this way, mission critical users can connect to specific key applications directly (or through the cloud based environment) to access and process critical data . . . away from the disaster area, even without the hyper-converged infrastructure being available.

Figure 12:
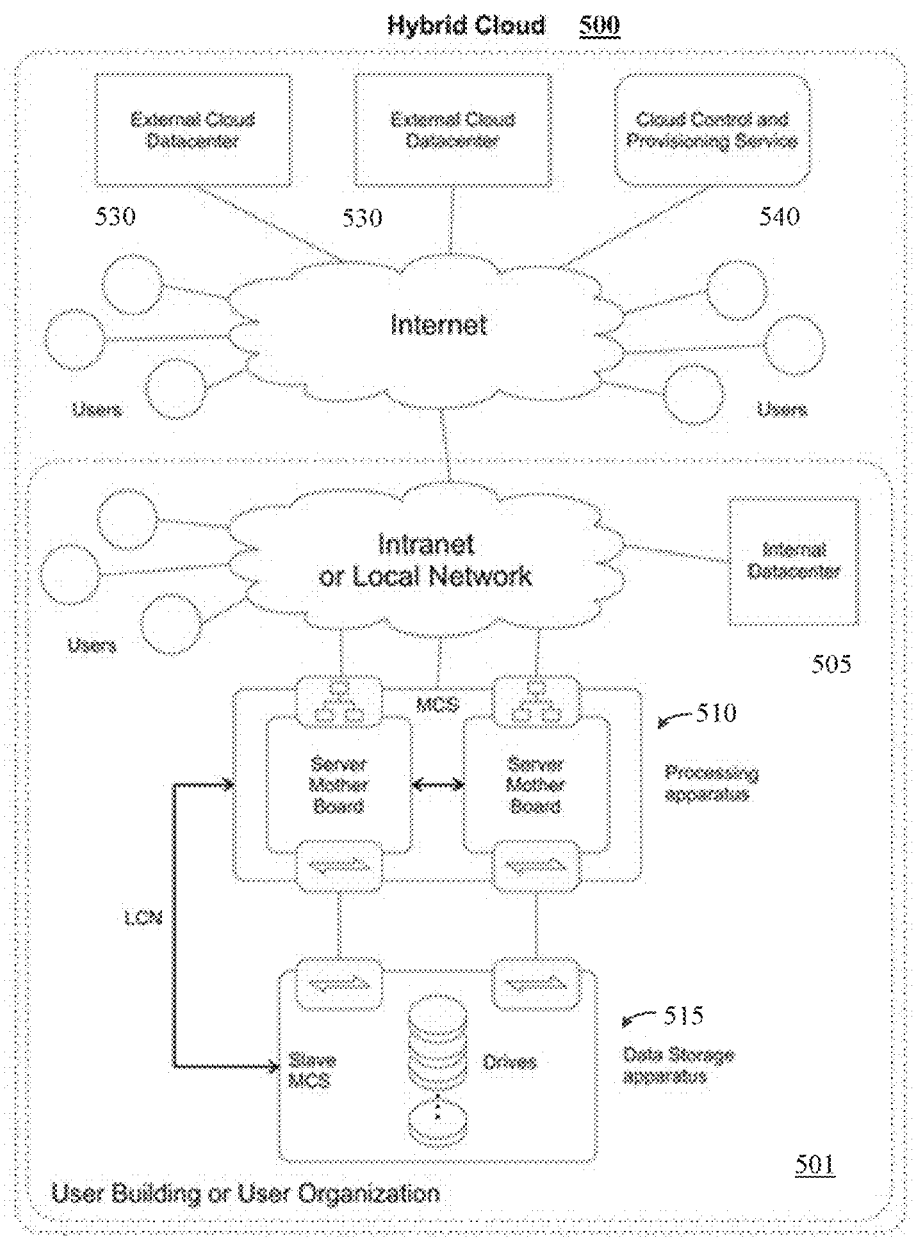
FIG. 12 is a configuration block diagram of a network with multiple nodes defining a data center located within a common building and/or organization, one of the nodes being defined by provisioning a processing apparatus and a data storage apparatus in master-slave relationship and individually configured as a carry-on portable apparatus, substantially as shown in FIG. 1, except in each instance the appropriate electronics are deployed in the example embodiment.

FIG. 12 is a configuration block diagram 500 of an organizational network 501 connected to a cloud-based computing environment 502 to form a first example hybrid cloud. The organization network in this first example is comprised of an intranet or like local network which allows users to run applications and retrieve/forward data to/from an associate datacenter 505. In an exemplary embodiment, the organization network is a hyper-converged network architecture with one or more computing nodes connected via a hypervisor which, along with other appropriate tools, manages, provisions, and administers network resources, performs backups, and the like.

In one scenario, the organization network 501 is comprised of a single node, provided by processing apparatus 510. Processing apparatus 510 may be internally configured entirely as shown in FIG. 11, or with more or fewer expansion slots, memory drives, or other features. In general, however, the intent is to show the incorporation of a portable carrier disposed apparatus that is capable of both connecting to a network and at the same time providing close and go disaster recovery in emergency situations.

In the example of FIG. 12, a second portable carrier disposed apparatus 515 is provided. This second apparatus is a data storage apparatus, and like processing apparatus is also capable of both connecting to a network and at the same time providing close and go disaster recovery in emergency situations.

Processing and data storage apparatuses 510, 515, respectively, each contain an MCS. The two MCS units are linked by an LCN interface and control, among other things, high data rate transfer of data between drives in processing apparatus 510 and the drives in data storage apparatus 515 (exchanged via linked fiber channels). Processing apparatus 510 is also linked to cloud resources as shown.

In the event of a possible catastrophic event, users may be unable to gain access to or more intra or extra nodes, including cloud datacenters 530 and cloud control and provisioning services 540, data center 505, processing apparatus 510, or data storage apparatus 515.

With the present invention, once aware that a catastrophic event has occurred or is forthcoming, action is taken to ensure that either or both the processing apparatus 510 and the data storage apparatus 515 initiate emergency shutdown routines. Cables connected thereto, if any, are removed, the lid (if open) is closed, and devices 515, 520 removed from whatever building location they may be found.

Figure 13:
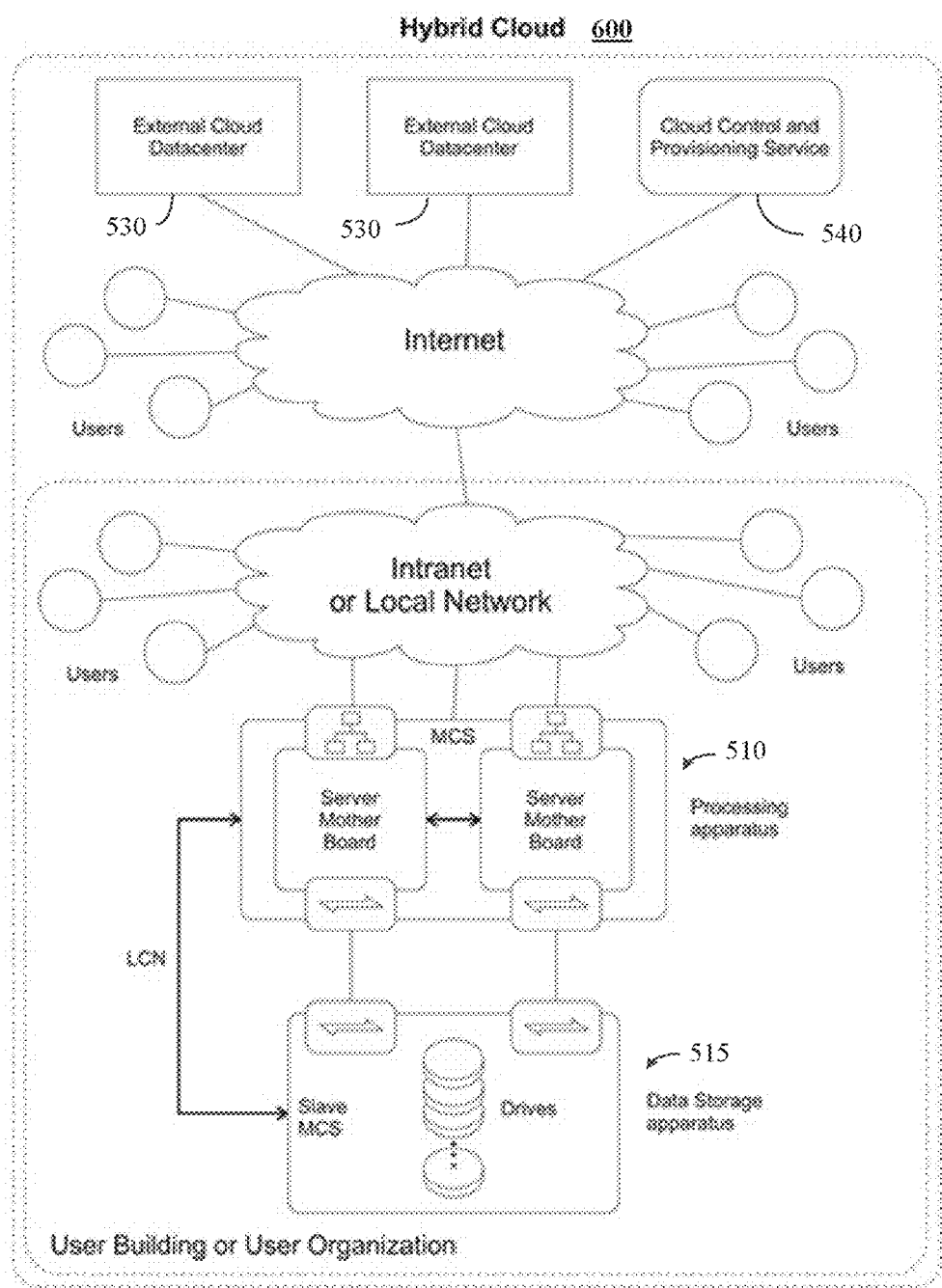
FIG. 13 is a network configuration block diagram similar to that shown in FIG. 12, except the processing and data storage apparatuses are that of a single computing environment node together providing all the necessary server functionalities found on traditional rack type server system, except in the present instance all the rack components are deployed as software defined elements of a hyper-converged system in the example embodiment.

FIG. 13 is a network configuration block diagram 600 similar to that shown in FIG. 12, except the processing and data storage apparatuses 510, 515 are that of a single computing environment node (i.e., the data center functionality is provided by 510, 515 which are connected in master-slave relationship). Together, apparatuses 510, 515 provide all the necessary server functionalities found on traditional rack type server system, except in the present instance all the rack components are deployed as software defined elements of a hyper-converged system.

Figure 14:
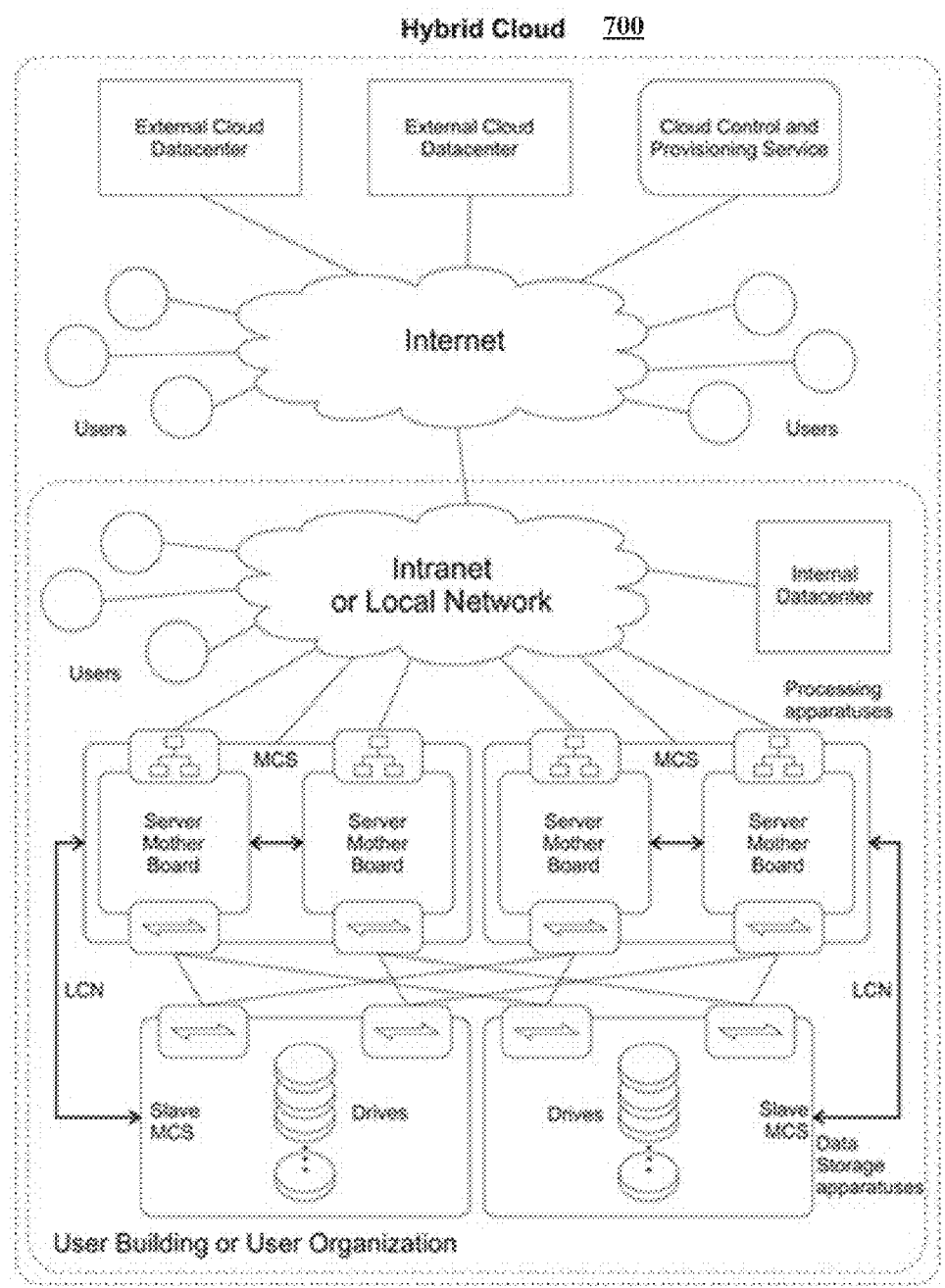
FIG. 14 is a further illustration of a network configuration deploying multiple processing apparatuses and multiple data storage apparatuses each provisioned to independently support scripts to facilitate data recovery from any one of different remote sited either in a building or across a network of computers geographically dispersed across an organization in accordance with a further example embodiment.

FIG. 14 is a further illustration of a network configuration 700 deploying multiple processing apparatuses and multiple data storage apparatuses each provisioned to independently support scripts to facilitate data recovery from any one of different remote sited either in a building or across a network of computers geographically dispersed across an organization in accordance with a further example embodiment.

Figure 15:
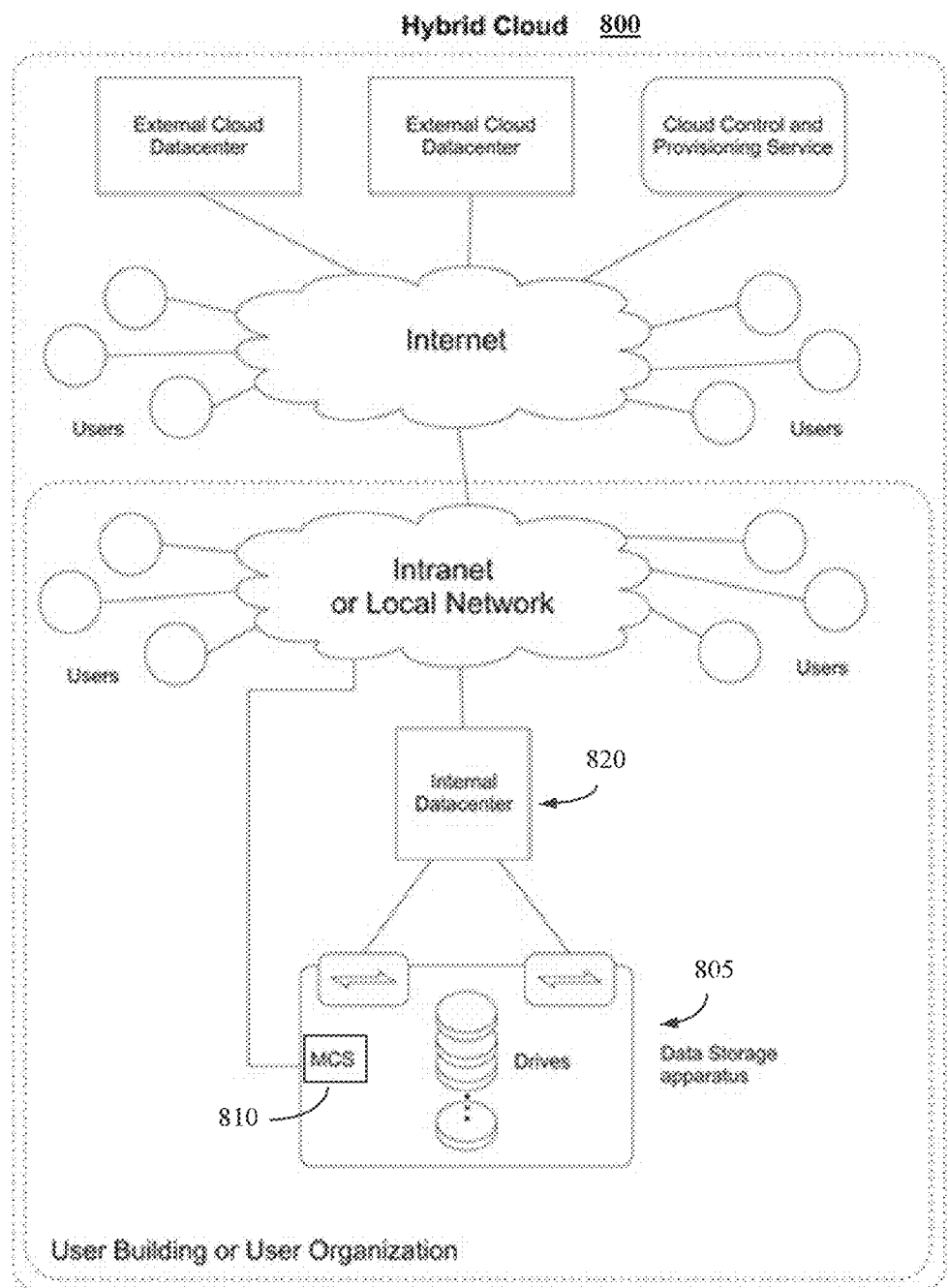
FIG. 15 shows a network configuration for a single data storage apparatus with integrated management and control system (MCS) provisioned by network virtualization resources and management tools to facilitate possible disaster recovery action, or use as a remotely linked device in harsh terrain and/or weather condition, or simply as a small form factor storage node on the network, in accordance with an exemplary embodiment.

FIG. 15 shows a network configuration 800 having a single data storage apparatus 805. An onboard MCS 810 connects directly to resources of computers (not shown) in internal data center 820. In one scenario, a hypervisor layer running across the entire intranet/local network and via corresponding MCS units in data center 820 allow data storage apparatus 805 to be provisioned accordingly. Once provisioned, and assuming provisioned for disaster recovery, in the event of a disaster apparatus 805 can be emergency shut down to protect the data stored thereon. When booted in emergency operation mode, it connects to the cloud or other network and reconfigures itself to support critical data storage support activities.

The proposed implementation presupposes that the hypervisor is able to pass scripts to data storage apparatus which will instruct it on how it should behave both in normal operation mode as well as emergency modes.

Figure 16:
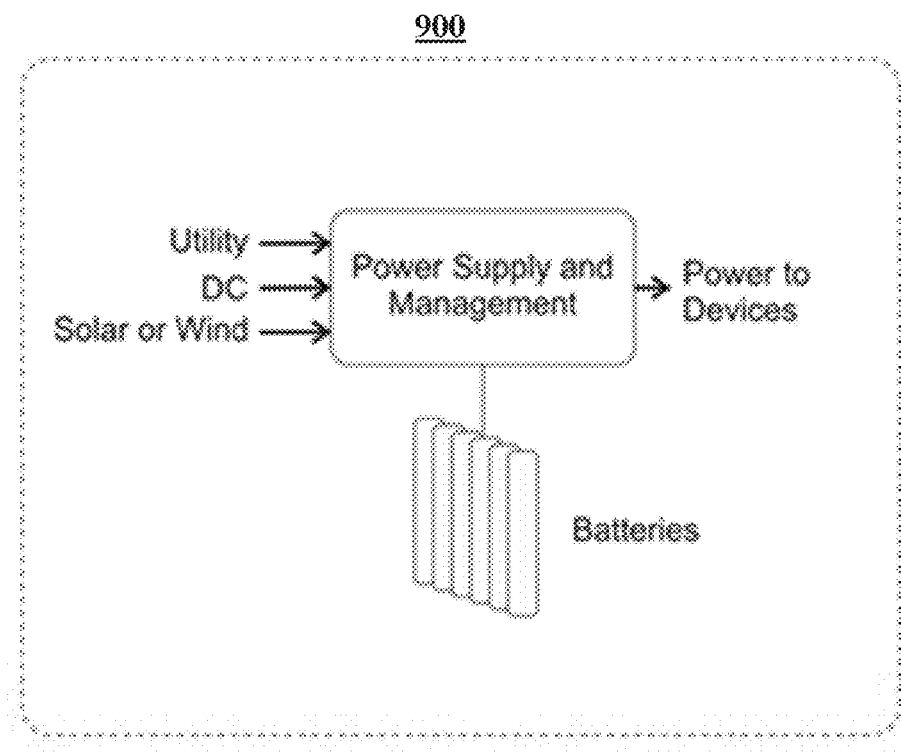
FIG. 16 is a high level functional block diagram of an example power supply and management unit connected to a set of chargeable batteries, configured to receive power from various alternate sources, and provide a steady power current/voltage source to onboard equipment in provisioned processing and data storage apparatuses in accordance with an exemplary embodiment.

FIG. 16 is a high level functional block diagram 900 of an example power supply and management unit connected to a set of chargeable batteries, configured to receive power from various alternate sources, and provide a steady power current/voltage source to onboard equipment in provisioned processing and data storage apparatuses in accordance with an exemplary embodiment.

Figure 17:
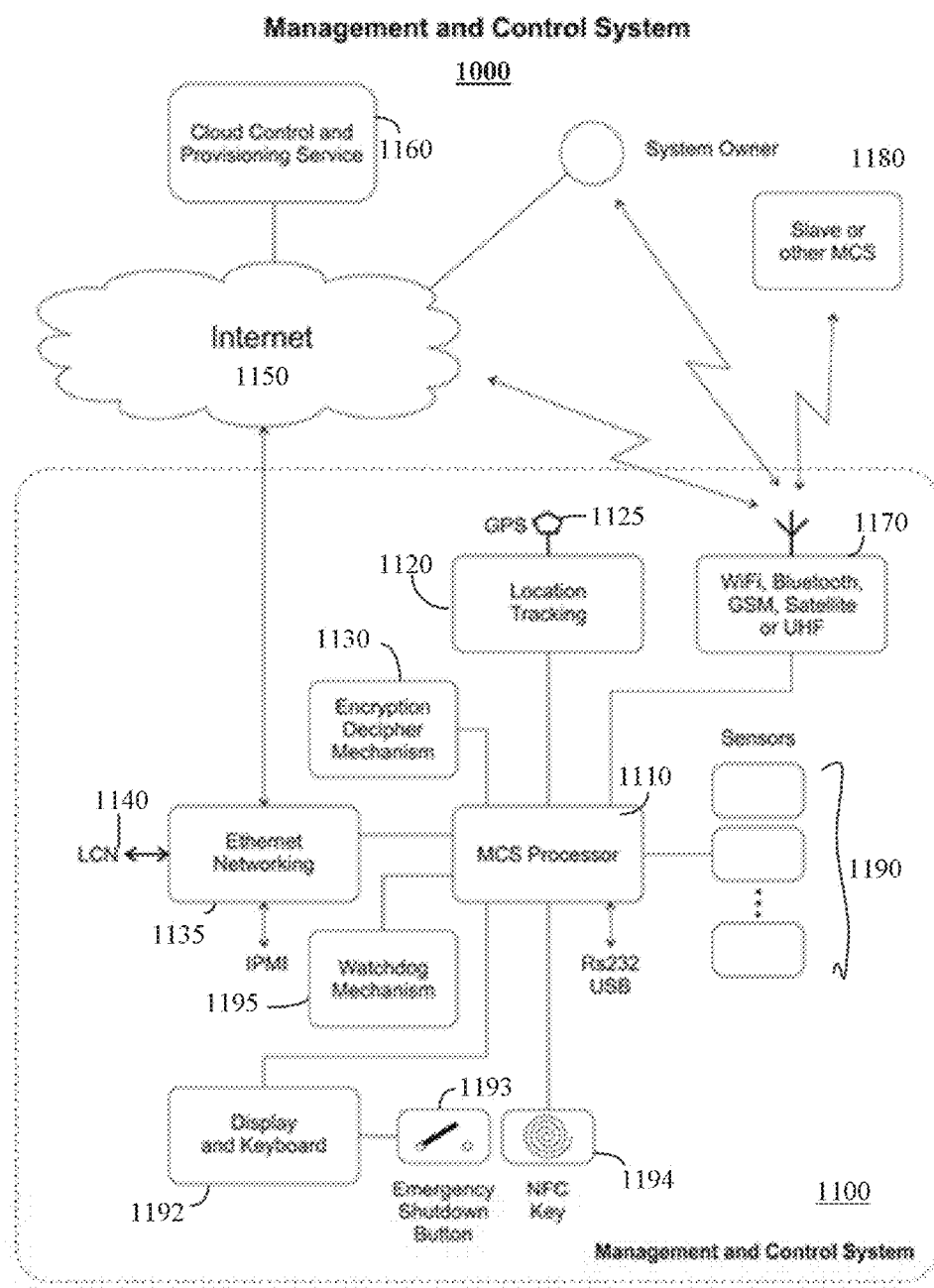
FIG. 17 is a high level functional block diagram of an example MCS capable of running scripts to provision processing and data storage apparatuses in accordance with an example embodiment.

FIG. 17 is a high level functional block diagram 1000 of an example MCS 1100 set up to run scripts to provision the processing and data storage apparatuses in accordance with an example embodiment.

Referring to FIG. 17, MCS 110 includes an MCS processor 1110. Processor 1110 provides overall system management and control to the other building blocks. These building blocks include location tracking circuit 1120 with integrated GPS receiver 1125 for tracking MCS position in emergency shutdown mode operation. Encryption decipher mechanism 1130 provides user authorization. Ethernet networking circuitry 1135 connects processor 1110 to other nodes on the network via an LCN interface 1140. In addition, ethernet networking circuitry 1135 may provide data link to internet 1150 for communication of processor 1110 to cloud control and provisioning service 1160. Cloud control and provisioning service 1160, in accordance with an exemplary embodiment, stores generated scripts downloaded by processor 1110 for provisioning the apparatus to run in a desired manner across each of four distinct operation modes described above pursuant to an organization disaster recovery or business continuity plan.

MCS 1100 further includes integrated baseband transceivers 1170 for establishing a variety of wireless communication links to a variety of resources. Such resources include slave or other MCSs of other nodes (1180) on the network, including similarly situated data storage and processing apparatuses. Transceivers 1170 also facilitate sending MMS, SMS, email, and the like messages to IT personnel, system owners, administrators and the like informing them instantly that the MCS has triggered an emergency shutdown routine. The messages may include device tracking information displayed in map form derived from geo-coordinates generated by location tracking circuit 1120.

A variety of different electrical, mechanical, piezoelectric and the like sensors 1190 alert MCS 1110 of environmental conditions, undesirable exposure to various risks, unwanted or undesirable shocks or hard impacts, extreme temperature changes and much more. Processor 1110 monitors sensor readings to identify and set in motion different actions depending on threat level. In one scenario, processor 1110 triggers an automatic emergency shut down in response to sensor readings indicative of, for example, possible earthquake occurrence.

Other components on MCS 1100 include a display and keyboard assembly 1192 coupled to an emergency shutdown button 1193, as well as NFC key reader 1194 and watchdog mechanism 1195 described below.

Figure 18:
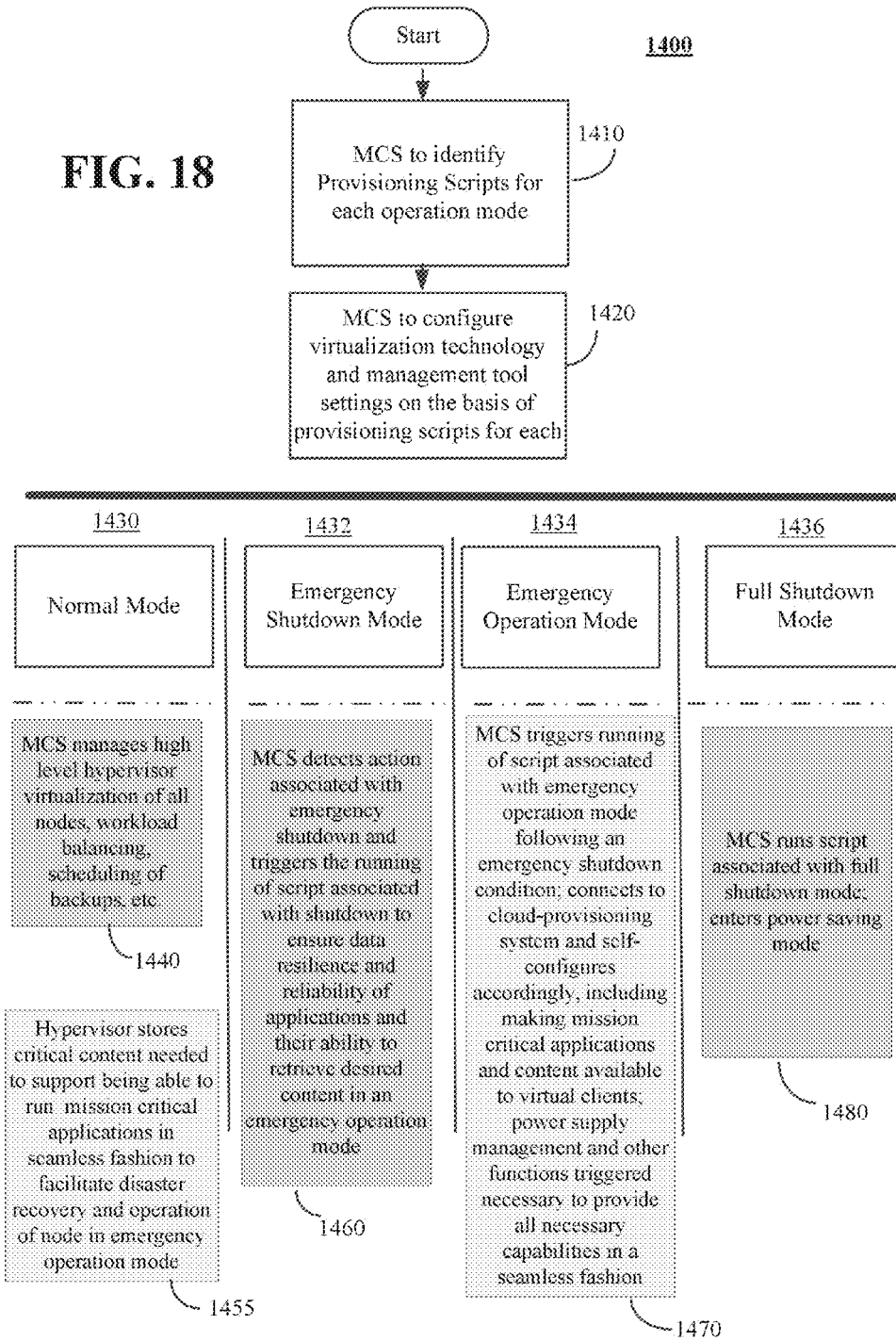
FIG. 18 is a high level operational flow diagram showing the MCS provisioning process that facilitates the use of processing and data storage apparatuses for use on a network but also for data recovery purposes in accordance with an exemplary embodiment.

FIG. 18 is a high level operational flow routine 1400 run in the MCS as part of the process to provision processing and data storage apparatuses in accordance with an exemplary embodiment.

Referring to FIG. 18, a first step in the provision process is to retrieve relevant provisioning scripts preferably from a remote cloud provisioning service established by the apparatus vendor to support such provisioning (step 1410).

The provisioning involves also setting up an apparatus as node in a cluster of computing nodes (1410). In one exemplary embodiment, the nodes are all running on a hypervisor layer and together constitute a hyper-converged system.

In NORMAL MODE (1430), the apparatus, and specifically the integrated MCS unit, manages all high level hypervisor virtualization of all nodes, providing workload balancing, scheduling of backups, etc, in the same manner as might a conventional non-portable rack system (1440). At same time, each processing apparatus stores critical content needed to support mission critical applications in seamless fashion to facilitate disaster recovery and operation of device in emergency operation mod (1455).

In EMERGENCY SHUTDOWN MODE (1432), the MCS detects action associated with emergency shutdown and triggers the running of script associated with shutdown to ensure data resilience and reliability of applications and their ability to retrieve desired content in an emergency operation mode (1470).

In EMERGENCY OPERATION MODE (1434), the MCS triggers running of script associated with emergency operation mode following an emergency shutdown condition. The MCS then connects to cloud provisioning service and self-configures accordingly. In another scenario, the self-configuration happens automatically from a prior stored script. However the case, the execution of the script results in mission critical applications and/or content alone becoming available to clients/users. At same time, the PSM unit is called-on to support and maintain power source needs. (1470)

In FULL SHUTDOWN MODE (1436), the MCS runs script associated with full shut down mode. This mode is very similar to emergency shut down more, except most all components, including beacons and the like, cease to consume power and are turned off (1480).

Apparatus Design

As previously mentioned, the aim is to provide compact, lightweight hyper-converged system capable devices. An ideal weight is less than 50 lbs in weight making it possible for a single person to be able to carry the device from any available top handle, side handles, or as a back pack using a backpack frame designed to strap around a person for carriage in rough terrain.

The external case and internal chassis and sub-chassis components are preferably made from metal (e.g., aluminum, titanium, or similar lightweight metals, synthetic material such as carbon fiber), bio/nano material, plastic, or any combination of these.

The case itself should be stiff. A material such as polypropylene or some combination of carbon fiber, kevlar and resins should be suitable. The case should function as an exoskeleton protection layer for the internal chassis and should provide mechanical isolation. An elastic foam material, a combination of different elasticity foams in layers, specially designed shape elastic foam, shock absorbing mounts, and any combination of these should be sufficient.

The case is provided with top access to make it easier to mount and dismount the chassis, allow for cleaning of the case and other components, as well as for replacing fans and components with ease.

Top access also makes simple connecting to I/O ports and sockets, as well as provide vents away from ground level which may be used as air intake and outtake for active cooling, battery exchange, etc. It also makes possible being able to close the lid in an emergency situation.

In terms of shock resistance, it should be appreciated that multiple layers of shock absorbing may be particularly desirable. A proposed three layer approach includes: (i) a first layer of elastic foam to absorb shocks between case and chassis, (ii) a second layer of shock absorbers between chassis and internal individual sub-chassis of every electronic device or assembly using combination of natural rubber for spring action and elastic polymer foam for the dumping action, and (iii) a third layer of shock mounts on every electronic device mounting on every sub-chassis using elastic rubber tubes and locking screws. The idea is that different shock absorbing material can provide different elasticity and dumping effect.

In an exemplary embodiment, interconnections are provided via cables to extent possible thus allowing free movement of each sub-chassis and each electronic device. In one design approach, electronic components and assemblies may shift as much as 8 mm-10 mm during extreme vibrations and shocks. Each layer of shock absorbing due to the different properties of elasticity and dumping attenuate shocks and the vibration frequencies in a very wide range.

In the first layer of shock absorbing material, the elastic foam absorbs impacts and deformations as well as certain high to mid range frequency vibrations. The second layer, due to inertia effects, absorbs hard impacts as well as medium frequency vibrations. The third layer allows some shifting to occur within a protected area, this being another way to absorb some of the impact, but also a suitable way to absorb low frequency vibrations. The proposed reliance on cables to interconnect electronic devices to one another facilitates this free movement without stressing connection points at the components themselves not the connectors connecting the points to one another Regarding the data storage apparatus, optional integration of backplanes can facilitate being able to communicate drive status data to the MCS.

By creating a network using both a processing apparatus and a data storage apparatus, the two together can be configured to function either as a single independent cloud or form part of a bigger hybrid cloud system.

In the embodiment of FIG. 12 for example, a data storage apparatus is connected to the processing apparatus over fiber channel in a cluster setup. A variety of different cluster set ups are possible as has been exemplified by FIGS. 13-15. Complexity often can translate to greater redundancy if implemented properly which is particularly desirable in a disaster recovery setting.

In a further exemplary embodiment, PSM units may support use of batteries (hot swappable preferably) to allow off grid long run times (>4 hours) and the ability to connect and switch seamlessly between a wide range of power sources to sustain power and simultaneously charge batteries with ease, e.g., AC 88V to 264V 50/60 hz (from utility, diesel/gas generators, etc.), DC 10V to 24V (from, for example, car batteries), DC Solar Panel power, DC Wind power generator, and 124V to 370V (typical power supply range in marine vessels).

Regarding the MCS units in each of the processing and data storage apparatuses, the MCS performs a number of important system functions.

The main system function is to set up necessary communication links (via, for example, available access to WiFi, Bluetooth, GSM, Satellite, UHF transceivers, etc.) to a proprietary cloud based control and provisioning service. In accordance with an exemplary embodiment, the cloud based control and provisioning service provides the system provisioning and shutdown scripts. It also provides access to user data information to/from the cloud and any connected storage nodes, VMs, etc.

In a preferred approach, external communications with the cloud based control and provisioning service are performed with appropriate encryption—decipher mechanisms. Such mechanisms are well known and include software integrated approached as well as the use of external electronic devices which facilitate authorization.

Also, an MCS unit as has been illustrated is configurable as a master or slave depending on the system setup. In such situations, the MCS includes a watchdog mechanism that restarts a process request when no response is indicated.

Master Management and Control System (MCS) Operation:

As has been explained, the MCS exercises control over execution functions associated with each of the four operating modes: a) Normal Operation, b) Emergency Shutdown, c) Emergency Operation and d) Full Shutdown.

In Normal Operation mode the system will monitor the operation of all subsystems, the environment around it using the sensors (it may monitor also location of the system), all will be communicated depending on the setup with the owner of the system by all communication means available using either Cloud based applications or appropriate software applications for desktop or mobile computer systems. Master MCS communicates with the proprietary cloud based control and provisioning Service (a service that facilitates the hypervisor of a cloud based Virtual machine system in which the set of the apparatuses are part of: (i) to get system provisioning scripts and shutdown scripts, as well as users data information (individual user Virtual Machine desktop data, stored data etc., and (ii)) to allow apparatus automatic setup being kept and updated with the Main Provisioning (MPS) script of the system in case there is a change from the original.

In one scenario, the MCS stores (and remotely updates) an alternative scaled down Emergency Provisioning (EPS) script that supports all the functionality and data access of the MPS script but uses fewer resources to do so, may not require access to cloud datacenter information, and may restrict access to data and resources to only users requiring access to mission critical services, applications, or data. The scope and extent of how the MCS decides what it can and cannot do is set by the EPS script and should be consistent with a well defined Business Continuity Plan in place for the organization.

In emergency shutdown mode, the MCS shuts down apparatus subsystems and sets it to operate at very low power. During the shutdown process, the MCS follows a predefined script (relative to the installed provisioning script) that will ensure fast, efficient and graceful shutdown of all applications and databases running in the apparatus without data loss.

In one approach, Emergency Shutdown mode is initiated by a long press of a physical Emergency Shutdown Button when available. This may be followed by additional user authentication by way of password or use of encrypted NFC or RFid tags in the possession of the party seeking authentication.

In addition to use action, an environmental trigger (i.e. detection of sudden high temperature, or flood, or strong movement of the system) induced from actively deployed monitoring sensors. In this scenario, user authentication may be unnecessary.

During Emergency Shutdown mode, the MCS may continue to monitor environmental conditions, and will employ location tracking, to identify and inform company officials of the present state and location of the apparatus upon removal from the premises so the apparatus may be quickly recovered and turned over to those personnel tasked with managing IT services during a disaster situation.

The communication mode selected by the MCS to relay whereabouts and other information (such as what triggered shutdown in the first place) will depend on what communication means are available to the MCS at the new location. WiFi, Bluetooth, GSM, Satellite and UHF transceiver links are all potential data pipes through which an MCS may attempt to pass its data.

Again, it is envisioned that all communications from the apparatus will utilize suitable Virtual Private Network (VPN) protocol access and encryption. To minimize power consumption loss attributed to continued failed attempts to communicate, attempts may be time sequenced, in increasing increments (e.g., seek to connect initially by doing a scan of available resources more frequently initially and less frequently as time passes without a successful connection.

In one approach, emergency operation mode may be initiated by explicit user action taken at the apparatus. Here again, user authentication may be required via the available MCS display and/or keyboard interface.

Once the apparatus is up and running, the MCS will retrieve the alternative scaled down Emergency Provisioning (EPS) script and use this to initiate system operation in emergency operation mode. This will allow users—attempting to authorize onto the newly established network—access to all the functionality and data access of the MPS script, but with the use of limited resources to do what they need to do. In a typical scenario, all this information they need will likely be available away from the external cloud with which the original network may have normally provisioned access to data. This is because access to the cloud will be restricted or more likely unavailable directly from the apparatus, and users will need to rely on locally stored files and applications. In another scenario, the bandwidth resources, in terms of power, or data transfer capability may be equally restricted as a power saving measure in a disaster situation. Again, the priorities assigned to who gets what and how much will all be determined a priori when the scripts are first prepared and consistent with the aims and objectives of an organization's Business Continuity Plan.

Full Shutdown mode can be started by a user command received at the MCS display or keyboard interface. Full Shutdown will do what Emergency Shutdown does and additionally the MCS itself shutdowns together with PSM. In this mode, only integrated long range active, passive or semi active RFid tags may remain operational. In Full Shutdown, the PSM can be disconnected as can the batteries and other electronic components in order to change out, repair, or reconfigure onboard components.

A slave Management and Control System (MCS) serves under a master MCS which commands the slave MCS to perform desired functions. The master and slave may communicate over an available short range wireless link, such as Bluetooth, if available.

Example commercial use scenarios of the proposed apparatuses are described below.

Financial Institution Computing Environment

Financial institutions characteristically comprise local data centers linked over a wide area network to a cloud-based infrastructure. A hybrid local and cloud network is thus typical.

A data storage apparatus as proposed herein may be readily integrated into such a hybrid cloud system. In fact, a data storage apparatus can be connected in cluster architecture to form part of the storage area subsystem of the hybrid cloud system. In a best use scenario, the data apparatus is physically located (or co-located, if we are talking about an existing computing room) in the security surveillance room and connected with via high speed fiber connection to the local data center. In this regard, the data storage apparatus will have at all times a real time mirror of the data being produced by the Data Center (all data from all transactions in real time).

As a practical matter, this data is synchronized at regular intervals (sometimes one or more times in the day) to the cloud infrastructure for back up/redundancy and other purposes.

In the event of a major disaster such as a hurricane, the chances the wide area network will be knocked out due to power failures in the local grid is substantial. When this happens, data centers run on generators during which the network continues to run all mission as well as non-mission critical applications waiting for power to come back up. In a true disaster situation, power grid failure is not temporary. Eventually, the data center will be forced to power down the generator (to avoid generator failure) and initiate system shutdown protocol. Soon thereafter, building evacuation begins with security personnel tasked with carrying out emergency evacuation.

While other systems may have been shutdown, the data storage apparatus located in the security remains powered up on account of the integrated power system long autonomy. In a properly implemented business continuity plan, a security officer would have been instructed to follow emergency shutdown protocol which may involve something as simple as pressing an emergency shutdown button located on the data storage apparatus. The data storage apparatus, in return, would respond by initiating its own graceful shutdown, under MCS control. At the same time, the MCS collects tracking information provided by an on-board GPS received which identifies where the data storage apparatus is located from the time emergency button was pressed onwards.

Shutdown procedure should last a minute or so and a visual confirmation (such as lights off) may be given to alert the security officer that it is safe to begin disconnecting fiber, ethernet and/or power cables, and finally to close the lid of the apparatus so it can be safely transported away from the building. At this point, the device enters hibernation mode and waits to be awoken, at which time it will initiate a different script, which would guide all next steps of the device consistent again with the business continuity plan.

In accordance with an exemplary embodiment, the data storage apparatus will have stored all transaction relevant files, records and updates created up to the moment of its having gone into hibernation. Even data created throughout the day not yet synchronized with cloud storage, in a hyper-converged architecture, would have been made available to the data storage apparatus and thus stored on the latter's local storage drives.

The data storage apparatus has been strategically designed having in mind possible worse case scenarios. On that account, the form factor, durability, material resistance, and other functional attributes discussed earlier which characterize the device as a data recovery solution, all play a key role in maintaining and ensuring data integrity for as long as necessary, or at least until all the data on the local drives has been properly imaged elsewhere and accessible to the company.

In the eventuality of building collapse, for example, before the security officer has been able to safely transport the device from disaster area, beacons transmitted by the device can aid in tracking the device for an emergency rescue. Even if a manual shutdown was not initiated in time, onboard sensors should have triggered auto emergency shutdown to ensure data integrity.

Once in a safe place, the data storage apparatus may be connected to a backup server system and immediately run at full speed without waiting the laborious task of restoring tapes.

Where multiple data storage apparatuses are deployed, the MCS will initiate the emergency operation script which will allow it to assign master and slave designations. In an exemplary approach, the master is the first device which is shut down and thus first to enter emergency shut down mode. The remaining data storage apparatuses will serve as slave devices. The key device to be transported out, in order of priority in this approach, in accordance preferably with an organization's Business Continuity Plan is the master device. On boot up of two or more data storage devices, the emergency operation sequence of each device will seek to identify whether it is a master device or not.

Hospital Computing Environment

Another use scenario is in a hospital. All modern hospitals nowadays have local data centers. To consider a next use scenario, we assume that just like financial institutions, hospital data centers also are set up in a hybrid cloud architecture, except this time in addition to adding data storage capacity by placing a data storage apparatus in the security room, for example, we will also add a network node and introduce a processing apparatus as well. And, just as with the case of the data storage apparatus which can be manually triggered to initiate emergency shutdown, so goes the processing apparatus. As such, it is preferable to also locate this device in a place where someone like a security officer will be able to manually press the emergency shut down button.

In a typical hospital scenario, many of the available processing nodes of the network share common data and applications and user devices are set up as parts of a Virtual Machine cloud. These same devices may also be connected also to an external cloud data center which stores huge volumes of archived data.

Because so terabytes of memory is generated on a daily basis from CT scans, X-rays, and the like digital information alone, offline backup storage to the cloud is not only common, it is often also necessary.

Now, let's take a worst case scenario, of a major disaster requiring hospital evacuation, and again let's assume that the security officer is aware of the Business Continuity Plan and knows to press the emergency shutdown process in the two apparatuses. Having done that, the security officer removes plugged equipment and cabling when safe to do so, closes the lids on both portable devices and safely transports the two devices to safety.

In the event of a flood situation in a multi-story high rise hospital, safety maybe the security room itself, in which case the only thing that needs to occur is for the security officer to initiate emergency shutdown and wait for IT personnel to arrive. In another scenario, safety may involve relocating the devices several stories higher to a safe-from-flooding location. Whatever the situation, we can assume that devices are safe and ready to be relaunched in emergency operation mode.

In a hospital scenario, complete evacuation, even in a disaster is not a trivial matter, and often not even possible. In some cases, an ongoing surgery may have been abruptly terminated because of permanent power shutdown of backup generators, life support systems may require switching to battery only mode, and much more. In all these cases, doctors, pharmacists, nurse and other medical practitioners may need to have immediate access to the real time captured patient records, as well as any for example CT scans or X-rays that may have been ordered and need to be accessed immediately, even in a disaster situation.

In the proposed use scenario, the device broadcast current location information. Transceiver devices detect the signals and alert IT personnel. IT personnel in turn are dispatched along with one or more laptops to the device location. Once there, appropriate cables are used to interconnect the devices and in ten (10) minutes or less a fully deployed disaster recovery IT solution is available capable of giving doctors and other hospital staff with wireless access on remote devices dispersed throughout the hospital, complete access to archived information. As long as doctors and staff are able to stay powered or can somehow tap into external power sources for their local remote devices, they will continue to have access and also upload data to the full resources required and which are now being provided by only two devices, whereas until then, these two same devices, functioned as little more than nodes on a multi-node, hybrid cloud network system, supporting dozens, if not hundreds of virtual machines on the network running on a hypervisor layer.

The apparatuses themselves are each equipped with integrated PSM units capable of providing power from external sources, as previously shown and described. As such, so long as there are cars with batteries that can be removed and hooked to the PSM units or, alternatively, solar power generating sources are locally available and capable of providing converted solar energy in the form of electric power to the PSM units, both apparatuses should be able to remain powered on indefinitely, and doctors can continue to access them to support their patients.

Newspaper Print Organization Computing Environment

Let's now consider a third use scenario. A newspaper company has a data room with storage and servers along with a cloud backup service. In the same cluster co-located within the same building at the Security Office is a pair of data storage and processing apparatuses, similar to the last scenario. All computing nodes, including the processing apparatus and possibly also the data storage apparatus, share the same data as well as applications supported by the hybrid cloud network architecture.

Due to the nature of the newspaper business, much of the data files generated consist of prepress photos, prints and other bog data files produced and used locally. Let's next assume an earthquake hits and the building suffers damage requiring its immediate evacuation.

In this case scenario there is little IT personnel can do to in a short amount of time available to them. Cloud backup services are most likely offline data due to speed limitations and not the last six hours. As in the previous two scenarios, building evacuation plans can mandate that security officers follow Business Continuity protocol requiring them to identify data recovery capable devices such as the pair of data storage and processing apparatuses and take necessary steps to initiate emergency shutdown protocol. When this happens, the integrated MCS in each device starts a shutdown sequence to cause all active services to stop, and in a given predefined order between actively served virtual machines to prevent unnecessary data loss in the process.

In an exemplary approach, the shutdown procedure has caused all the devices to properly shut down services, back up necessary data, turn on GPS tracking, and shut down within two (2) minutes or less. Security officers then disconnect cables, close lids if open, grab and go.

Employees working on mission critical projects who were able to take their laptops with them or have substitute laptops pre-loaded with necessary applications locally or accessible directly from the processing apparatus, can be directed to a common site (a local hotel conference center for example). At this site, IT personnel will be able to boot the data storage and processing apparatuses in emergency operation mode. In so doing, all relevant data and resources would again be live and complete for access and provide a virtual working environment for the employees. The employees in turn would be able to immediately pick up where they left off with minimum legal exposure or business risk to clients who may be depending on the availability of the system, as in the case of, for example, investment related activities, medical record keeping, and/or large value projects where even a minor delay could bankrupt the proprietors.

When things are calm and a new facility to relocate to is up and running together with a functioning hybrid cloud system, the apparatuses are migrated to this new facility and reinitiated to run in normal operation mode once again.

It should be appreciated that the proposed apparatus construction and functionality enhances the resilience of an organization by providing the capability to transfer large amounts of data from one place to another, either within the same premises or between different premises who have no physical connection, while the embodiment—which is acting as the transporter—is continuously powered autonomously and serves applications and data to clients either via various means of networking. Therefore the probability of the clients experiencing downtime is extremely low.

Also, in eventualities such as earthquakes, tornados or other natural disasters, as well as intentional disasters (e.g., arson) and intentional and unintentional business disruptions, where there is an opportunity for an on-site data center of an organization to be taken down, the present approach is a best in class solution for ensuring cost effective business continuity.

In the example of an evacuated hospital scenario above, where patients are relocated to another hospital, the present approach provides a clever and cost effective solution for getting real time, up to date patient data to the people that need this information.

There are types of classified data that are cannot be stored at a cloud outside the organization's premises, therefore off-premise cloud storage cannot be a measure of resilience. In such case, the embodiment provides a measure of resilience, especially taking into account the self-destruction mechanisms that add an extra layer of security for sensitive data. Such organizations can be diplomatic missions, army camps or teams (e.g. when an operation finishes and the stored data are no longer available, they may be destroyed so that the soldiers do not have to carry the appliance back) or even aircraft (e.g. data destroyed when the pilot ejects to evacuate, so that the enemy may never have access to the stored data), and financial institutions.

The combination of portability and high performance characteristics also assist organizations in storing high volumes of data that have to be accessible quickly by parties outside the premises. For example, an organization may use the embodiment to store data such as emails or logs or transaction logs or video recordings that may be asked at some point by an authority or auditor for regulatory or forensic or security purposes.

At the hyperconverged database type management system, by way of example, an MCS in each node collaborates with MCSs in other nodes in order to optimize system services, provide backup, storage utilization, CPU bandwidth processing, and other functions.

When a node goes down for whatever reason, the hypervisor layer steps in to reallocate resources, enable data recovery, initiate backups, and take other necessary steps that will allow the processing apparatus to be shut down, removed and restarted in emergency operation mode.

Backups kept at the same location as the main computing platform(s) can either take long to restore or be affected by the same disruptive incident that the main platform was affected by. Backups kept at different locations may take long to restore, as they will have to either be physically transported from a different location to the main site and be restored or also be affected by the same catastrophe.

Redundant/high-availability systems in the same physical location with the main computing platform may fail due to the disruptive incident that led to the failure of the primary system. High-availability systems in different locations (either belonging to the business or to a cloud computing provider) have a high dependency on network connections between the different locations. Such network connections, even if they are redundant, can be affected by disruptive incidents therefore rendering business users unable to access the information.

Even if an organization has established a resilient computing system, it is also the networking infrastructure within the premises of the organization that could have been affected by the disruptive incident, therefore rendering the employees unable to have access to applications and data.

On the other hand, there are solutions of modular datacenters where large constructions or retrofitted shipping containers host data centers, containing racks with server and networking appliances. These datacenters may be mobile and require a truck if they have to be transported. There have been designs of "portable" servers that are bulky and require two or more persons in order to be carried, therefore making their transportation during a disruptive event extremely difficult, or home-made designs of cases that can be carried by a single-human but with limited computing capabilities, without power autonomy and simple design that do not provide resilience.

Another factor, which is of paramount importance for business continuity is the existence of electrical power. Uninterruptible Power Systems (UPSs) may provide power to servers for a very few hours, if not minutes, pose a significant capital expenditure and are bulky. Power-generators may be in place and provide power for as long as they are being refueled, but their solution depends on whether they or their fuel supply system have been affected by the disruptive incident, for example if there has been a flood. There are cases where fixed solar/photovoltaic panels have been used to power modular or fixed-place datacenters that have size of more than one server rack and are not portable by a single human, or cases where small solar/photovoltaic panels power portable computers-laptops.

Lost data or delay in accessing data after a disruptive event may lead to either deterioration of health of individuals, in the case of a healthcare provider not being able to access patient data electronic medical records, or to financial and reputation damage due to missed sales or affected customer service. Of course, there may be legal consequences either for the organization or for individuals related to the organization or for both.

Of paramount importance is the highest possible availability of computer systems (applications and stored data) that are important in achieving the organization's goals. A simple representation of Availability in Systems Engineering is as a ratio of the value of the uptime of a system to the aggregate of the values of up and down time, or:

$$A = \frac{Uptime}{Uptime + Downtime}$$

where Uptime can be defined as the time an item is capable of performing its primary function if called upon to do so, and Downtime as the time during which an item is incapable of performing its primary functions. It is therefore obvious that the lower the Downtime the higher the Availability will be.

Organizations take measures that decrease downtime either due to expected events (such as maintenance) or unexpected events (such as an earthquake), by implementing static backup and/or static redundant systems, where static means non-portable. These static measures may be used to mitigate specific risks each time. If a backup and/or redundant appliance or system of appliances (for example "network leading to a backup/cloud datacenter") is affected by a disruptive event then the new level of resilience will be lower than the former. This will be because the number of redundant/backup systems available will be decreased. For example: suppose an organization has implemented a business continuity management plan and has its data stored in a hybrid-cloud structure, with highly available systems both at a datacenter and in the cloud. If the network connection between the organization and the cloud is interrupted due to the effects of a natural disaster, e.g. a tornado or a tsunami, then the organization may be able to access the on-site data and one of the two backup solutions will be off (the cloud). If the organization's static on-site datacenter becomes unable to operate due to a flood caused either by the tornado or another reason, then and the organization will suffer Downtime.

The proposed implementations address the need to maintain a high level of resilience not only after one disruptive event, but also after a series of disruptive incidents, either related or unrelated, by providing a portable by a single-human application and/or storage appliance or system of appliances, which enable the organization to overcome the effects of a disruptive or a sequence of disruptive events due to the ability to be transferred to a different location and therefore adapt to the new conditions.

These and other features and advantages of the present invention will be apparent from the description of exemplary embodiments provided herein.

The embodiments described above are intended to illustrate aspects of the invention and modifications, variants and equivalents such as would be readily apparent to the skilled person are encompassed within the scope of the invention such as defined, for example, by the claims.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein

What is claimed is:

1. A carry-on sized, portable apparatus adapted for use in disaster recovery, rough terrain, and harsh weather conditions and configured for use as a processing apparatus, the processing apparatus including an exoskeleton carrier case with internally disposed chassis, the chassis including sub-chassis sections to securely contain (i) an integrated power supply and management system (PMS), (ii) an integrated management and control system (MCS), (iii) a local control network (LCN) interface for wireless and wireline communication with an external master or slave MCS, or to operate the integrated MCS in stand-alone fashion, and (iv) at least one server mother board each disposed on corresponding expansions cards along with a plurality of memory drives, wherein the integrated MCS is configured to provision the processing apparatus to run hypervisor and other tools to provision and support operation of the processing apparatus in at least the following modes normal operation mode, emergency shutdown mode, emergency operation mode, and full shutdown mode.

2. The portable apparatus of claim 1, wherein the integrated MCS is configured to:
identify scripts that allow the portable apparatus to configure itself for operation in each said normal operation mode, emergency shutdown mode, emergency operation mode, and full shutdown mode;
identify a current operational state; and
perform provisioning in accordance with the corresponding script associated with the current operational state.

3. The portable apparatus of claim 1, wherein the portable apparatus weighs less than 50 lbs.

4. The portable apparatus of claim 1, wherein the exoskeleton carrier case is made from durable, waterproof material, the exoskeleton carrier case and internal chassis housed therein being separated in whole or in part by mechanical isolation material.

5. The portable apparatus of claim 1, wherein the exoskeleton carrier case includes at least one of detachable wheels to accommodate different wheel types, including sled type fittings.

6. The portable apparatus of claim 1, wherein the exoskeleton carrier case is a top-access design to facilitate dismounting the internal chassis and components coupled thereto from the top during integration, setup, cleaning, repair, battery exchange, or the like, and at the same time prevent water from entering the interior below a certain height from the ground base for flood protection.

7. The portable apparatus of claim 1, wherein the exoskeleton carrier case is configured so that all I/O ports are accessible from the top with electrical TO wiring being configured to connect to the TO ports from the top plane of the chassis, and easily removable to allow the carrier top lid to be closed quickly and easily in an emergency situation.

8. The portable apparatus of claim 1, wherein the portable apparatus comprises at least three shock absorbing mechanisms including: (i) elastic foam to absorb shocks between the exoskeleton carrier case and the internal chassis, (ii) shock absorbers disposed between the internal chassis and all internal individual sub-chassis housing individual electronic component or assembly made from a combination of natural rubber for spring action and elastic polymer foam for dumping action, and (iii) shock mounts made from elastic rubber tubes and locking screws.

9. The portable apparatus of claim 1, wherein the portable apparatus is configured with floatation enabling material to provide floatation in event of flooding.

10. The portable apparatus of claim 1, wherein the portable apparatus is configured with a pre-heating mechanism for operation in extremely cold environments.

11. The portable apparatus of claim 1, wherein the portable apparatus is operable as a regular storage node in a non-converged system and as a node of a hyper-converged system with the plurality of memory drives being provisioned as a virtual server under the control of virtualization technology managed by the integrated MCS.

12. The portable apparatus of claim 11, wherein the portable apparatus is configured for quick extraction from the hyper-converged system in the event of a disaster for remote re-deployment.

13. The portable apparatus of claim 1, wherein the integrated MCS runs virtualization technology and configured for use as a single node, or as a node in a cluster of nodes, of a hyper-converged system.

14. The portable apparatus of claim 13, wherein the portable apparatus is configured for quick extraction from the hyper-converged system in the event of a disaster and also configured to be able to re-establish communication for users requiring immediate access to mission critical applications in remote re-deployment.

15. The portable apparatus of claim 1, wherein the provisioning occurs on the basis of the integrated MCS detecting and processing appropriate scripts, at setup, which on the one hand manage and control what the processing apparatus does when connected as a node to the hyper-converged system, and on the other hand, what the processing apparatus needs to do in the event of a major disaster requiring that it be disconnected from the system and transported safely away from any imminent threat.

16. The portable apparatus of claim 1, wherein provisioning involves a user connecting to the apparatus via a proprietary cloud based control and provisioning service, identifying the scripts for each relevant operating mode, and using them to program the hypervisor layer so that the onboard electronics of the processing apparatus function and behave as one with other hypervisor managed nodes in a hybrid cloud computing infrastructure.

17. The portable apparatus of claim 1, further comprising a location tracking unit.

* * * * *